(12) United States Patent
Suzuki et al.

(10) Patent No.: US 8,191,666 B2
(45) Date of Patent: Jun. 5, 2012

(54) VEHICLE SAFETY DEVICE

(75) Inventors: Atsushi Suzuki, Nukata-gun (JP);
Hidekazu Nishigaki, Nagoya (JP);
Atsushi Kawaguchi, Nissin (JP); Yasuo Asaga, Aichi-gun (JP); Daisuke Yamada, Nagoya (JP); Tomoko Abe, Aichi-gun (JP); Yoshikatsu Kisanuki, Seto (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 284 days.

(21) Appl. No.: 12/530,327

(22) PCT Filed: Feb. 29, 2008

(86) PCT No.: PCT/JP2008/053660
§ 371 (c)(1),
(2), (4) Date: Sep. 8, 2009

(87) PCT Pub. No.: WO2008/111413
PCT Pub. Date: Sep. 18, 2008

(65) Prior Publication Data
US 2010/0108424 A1    May 6, 2010

(30) Foreign Application Priority Data

Mar. 9, 2007  (JP) .................. 2007-060193
Oct. 23, 2007  (JP) .................. 2007-274925

(51) Int. Cl.
*B60R 21/34* (2011.01)

(52) U.S. Cl. .................. 180/274; 296/187.04

(58) Field of Classification Search .................. 180/69.2, 180/69.21, 232, 274; 296/187.04, 193.11; 293/107, 111
See application file for complete search history.

(56) References Cited

U.S. PATENT DOCUMENTS

| 4,946,002 | A * | 8/1990 | Vu et al. .................. 180/271 |
| 6,510,914 | B2 * | 1/2003 | Ishizaki et al. .................. 180/274 |
| 6,953,220 | B2 * | 10/2005 | Takehara .................. 296/187.04 |
| 2004/0134705 | A1 * | 7/2004 | Nadeau et al. .................. 180/274 |

(Continued)

FOREIGN PATENT DOCUMENTS

JP    48-25541    7/1973

(Continued)

OTHER PUBLICATIONS

Japanese Office Action issued Oct. 4, 2011, in Patent Application No. 2007-274925 (with English-language translation).

*Primary Examiner* — Joseph Rocca
(74) *Attorney, Agent, or Firm* — Oblon, Spivak, McClelland, Maier & Neustadt, L.L.P.

(57) ABSTRACT

A safety device for a vehicle, capable of relaxing a collision load acting on a colliding body. The safety device (10) for a vehicle has colliding body receiving sections (24), and opposite longitudinal ends of each colliding body receiving section (24) are bent to form legs (26) having ends (26A). The ends (26A) are fixed to side frames (16) on the vehicle body side to form impact absorption members (22). The safety device (10) is adapted so that, while supporting a collision load, the impact absorption members (22) are displaced to absorb collision energy of the colliding body. The impact absorption members (22) can produce displacement regions that acts against an increase in the displacement in the direction of collision to suppress an increase in supporting load.

15 Claims, 34 Drawing Sheets

U.S. PATENT DOCUMENTS

| | | | |
|---|---|---|---|
| 2005/0278098 A1* | 12/2005 | Breed | 701/45 |
| 2006/0260855 A1 | 11/2006 | Yoshitake | |
| 2007/0080010 A1 | 4/2007 | Gust | |
| 2011/0181073 A1* | 7/2011 | Aase et al. | 296/187.04 |

FOREIGN PATENT DOCUMENTS

| | | |
|---|---|---|
| JP | 48-57339 | 8/1973 |
| JP | 49 110432 | 9/1974 |
| JP | 58-157854 | 10/1983 |
| JP | 4-16068 | 2/1992 |
| JP | 8 183423 | 7/1996 |
| JP | 10 217903 | 8/1998 |
| JP | 2000-255350 | 9/2000 |
| JP | 2002 370611 | 12/2002 |
| JP | 2003 260994 | 9/2003 |
| JP | 2004 175153 | 6/2004 |
| JP | 2005 145224 | 6/2005 |
| JP | 2005 297755 | 10/2005 |
| JP | 2006 290297 | 10/2006 |
| JP | 2007-216933 | 8/2007 |
| WO | 2005 030539 | 4/2005 |

* cited by examiner

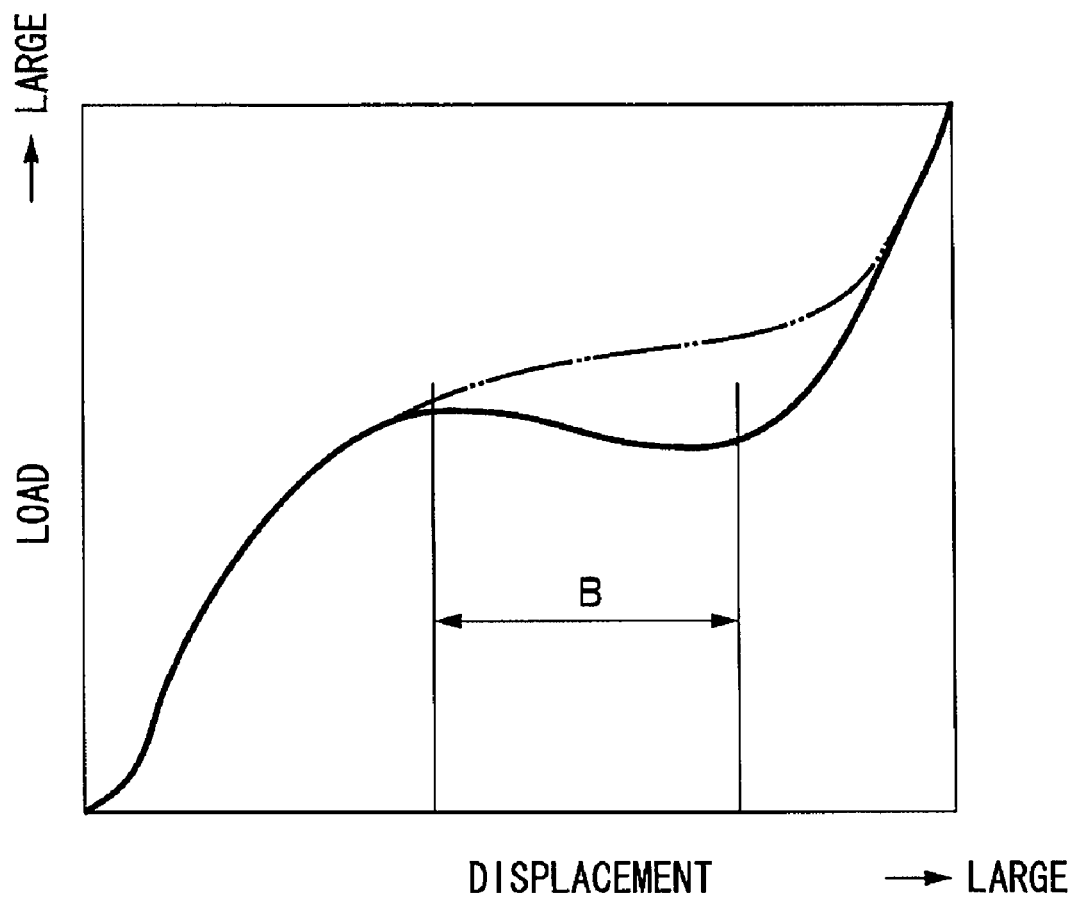

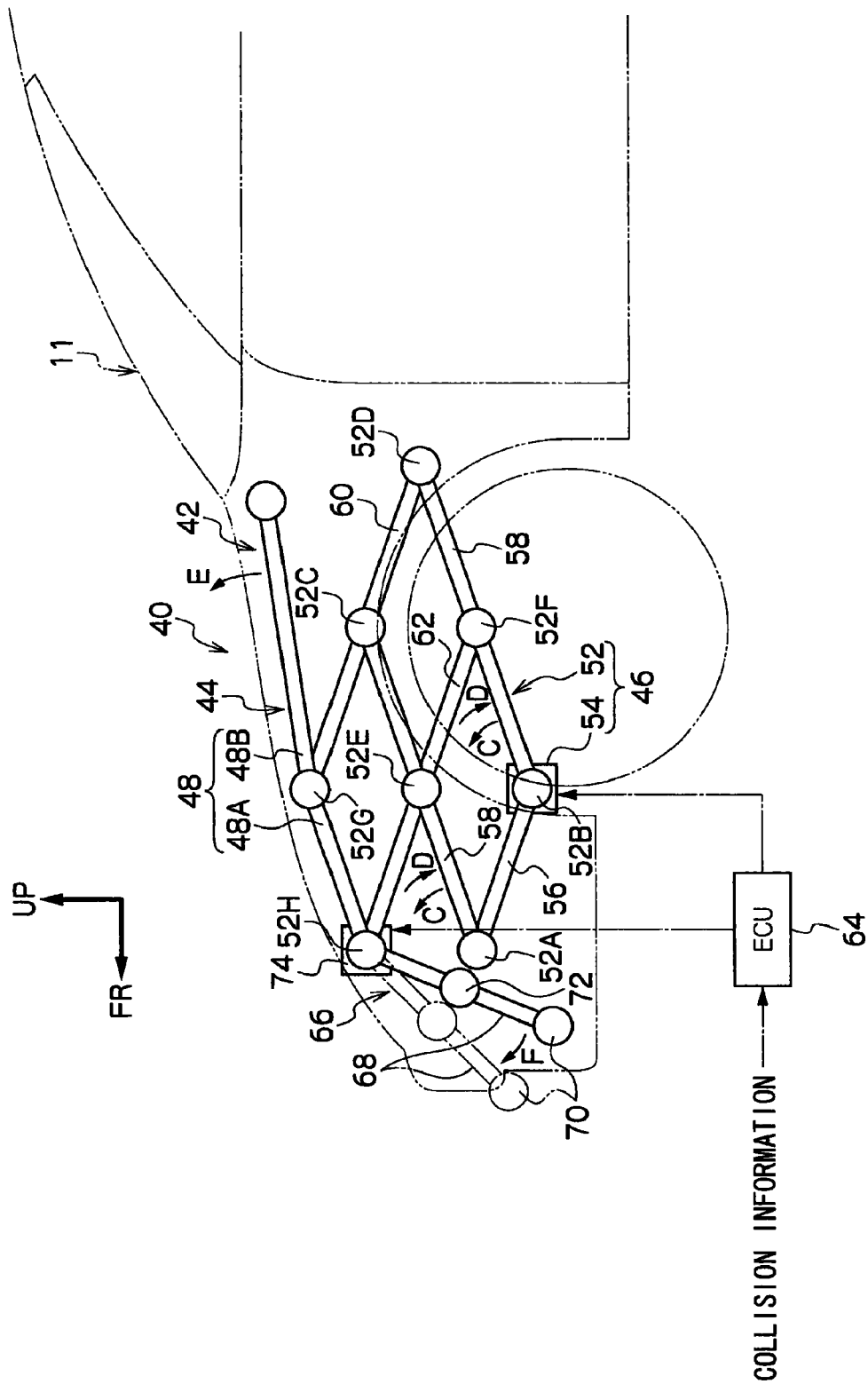

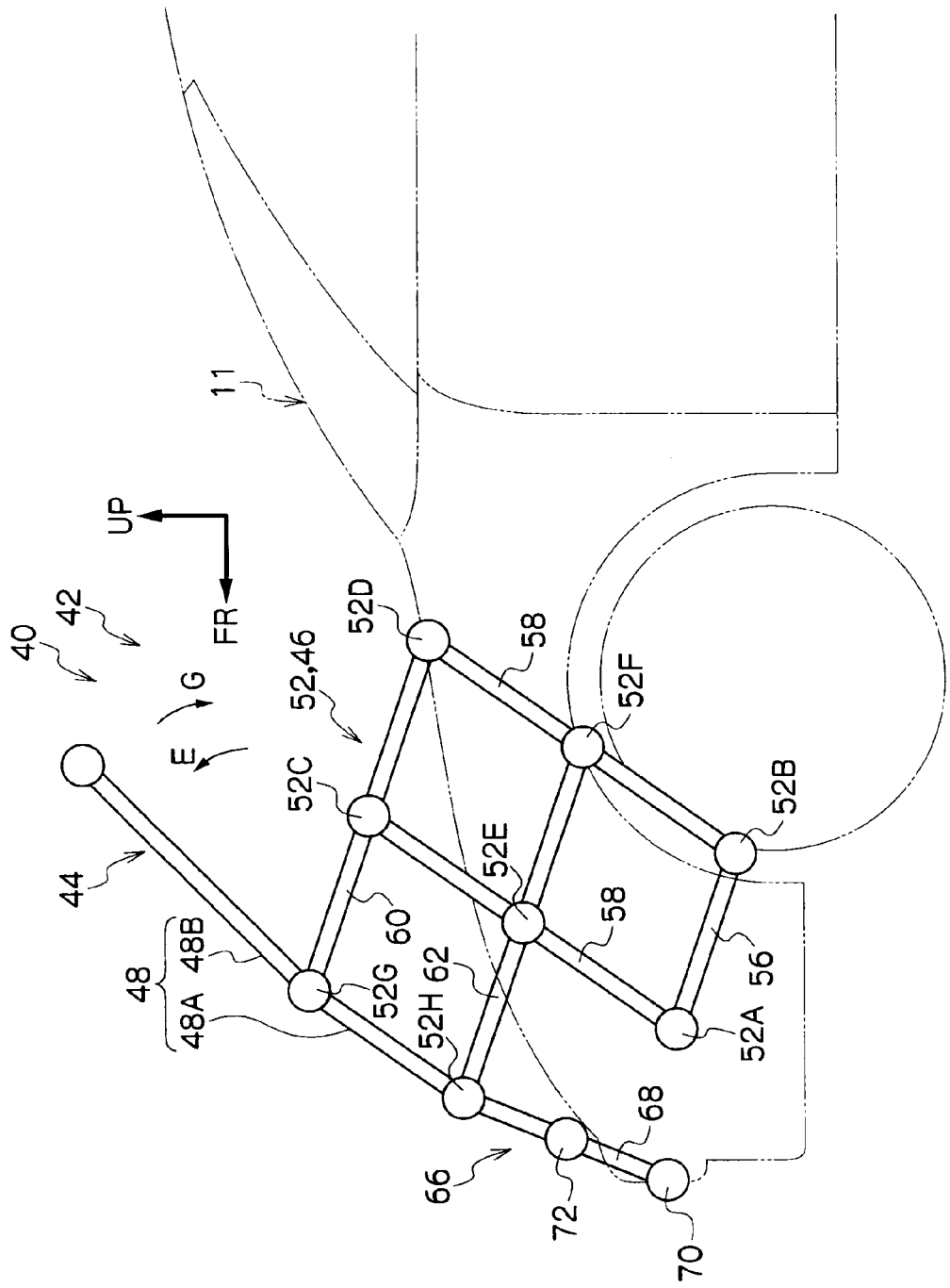

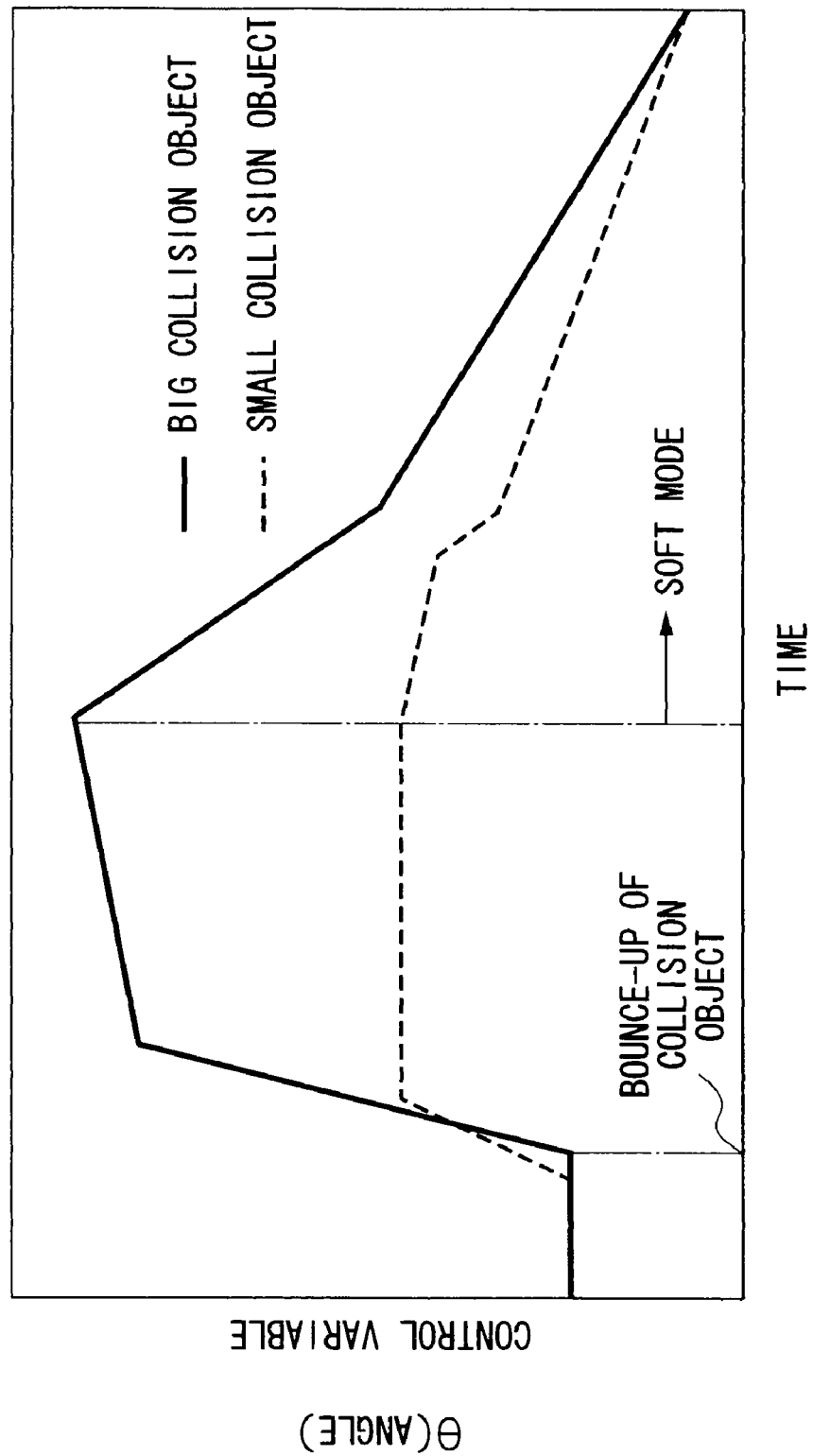

VEHICLE SAFETY DEVICE

TECHNICAL FIELD

The present invention relates to a vehicle safety device for alleviating impact which a collision object with a vehicle body receives.

BACKGROUND ART

In order to alleviate impact acting on a collision object which collides with a bonnet (engine hood) exposed face up at the vehicle front portion, there has been known a technology in which a back end of a bonnet of which a leading end is supported rotatably by a vehicle body is bounced up simultaneously with collision of the collision object thereby to secure an impact-absorption stroke (refer to, for example, Patent Document 1: JP-UM-A No. 49-110432). Further, there has been known a technology in which a bonnet is composed of a double structural body, and a surface layer of the bonnet is swelled upward by fluid pressure at the collision detecting time thereby to secure an impact absorption stroke (refer to, for example, Patent Document 2: JP-A No. 10-217903). Furthermore, there has been known a technology in which a hood bag is developed so as to cover the upper surface of a bonnet when a vehicle has predicted the collision (refer to, for example, Patent Document 3: JP-A No. 8-183423).

Further, in order to alleviate impact acting on a collision object which collides with an engine hood located at the vehicle front portion, there has been known a technology in which a hood bag is developed so as to cover the upper surface of a bonnet when a vehicle predicts the collision (refer to, for example, Patent Documents 3 and 4: JP-A No. 2004-175153). In the technology in the Patent Document 4 the collision object is grasped by an adhesive layer provided for an airbag thereby to prevent the collision object from falling down on a road surface. Further, in the technology in the Patent Document 3, a gate bag developed in the arch shape is provided for an airbag, and a protection net is provided inside the gate bag to prevent the collision object from falling down on a road surface.

DISCLOSURE OF THE INVENTION

Problem to be Solved by the Invention

However, in the above conventional each technology, there is fear that a load acting on the collision object increases gradually during the impact absorption because the deformation amount of a spring increases as the collision object approaches the vehicle, or because of the structure in which the internal pressure of the portion swelled up by the pressure is increased. Therefore, there is room for improvement in this point. Further, in the technology in the Patent Document 4, if inertial force of the collision object is large, the airbag is separated from the vehicle body. Therefore, there is possibility that the collision object cannot be retained by the vehicle body. Further, in the technology in the Patent Document 3, there is fear that the collision object grasped by the protection net may fall from the opening side of the gate bag after impact absorption.

It is an object of the present invention to provide a vehicle safety device capable of alleviating a collision load acting on a collision object.

Method of Solving the Problem

A vehicle safety device according to a first aspect of the present invention is a vehicle safety device which is displaced while supporting a collision load thereby absorbing collision energy of a collision object, comprising: an impact absorption unit which can generate a displacement area that suppresses an increase in a supported load with respect to an increase in displacement in the direction of collision.

According to the above aspect, when the collision object collides with the impact absorption unit (with a vehicle body through the impact absorption unit), the impact absorption unit is displaced toward the vehicle body side while supporting the collision load, and the collision energy is absorbed by the integral of the load and the displacement. The impact absorption unit configuring the vehicle safety device, since it has the displacement area which is displaced while suppressing the increase in supporting collision load (>0) and absorbs the impact energy, restrains a high (peak) load from acting on the collision object during aborting the impact energy.

Thus, the vehicle safety device according to the above aspect can alleviate the collision load acting on the collision object.

In the above aspect, a configuration may be provided wherein the impact absorption unit comprises: an impact absorption body having an elongated load input portion, a pair of legs each being coupled at one end to a different end in the longitudinal direction of the load input portion, and a support portion to which the other ends of the pair of legs are fixed such that contact and separation of each of the pair of legs in the longitudinal direction of the load input portion is regulated; a drive unit which can drive the impact absorption body in a direction of separation from the vehicle body; and a controller which, if the controller has predicted a collision with the collision object, controls the drive unit so that the impact absorption body is driven by a predetermined amount in the direction of separation from the vehicle body.

According to the above aspect, if the collision of the collision object with the load input portion is not predicted, the load input portion is located in a close position to the vehicle body. On the other hand, the controller, if it has predicted the collision of the collision object, controls the drive unit and moves the impact absorption body from the close position to the separated position. Hereby, an impact absorption stroke by which the load input portion of the impact absorption body can be displaced toward the vehicle body side is created. When the collision object collides with the load input portion of the impact absorption body, the impact energy is absorbed while the long load input portion is deflected. Here, this impact absorption body, since the relative displacement (contact and separation in the longitudinal direction of the load input portion) of the pair of legs each fixed to the support portion is regulated, can obtain, by deformation of the pair of legs (by deformation of a corner portion between the pair of legs and the load input portion), the displacement area which acts against the increase in displacement to suppress the increase in supporting collision load. At this time, since the impact absorption stroke is created by the action of the drive unit before the collision as described above, favorable impact absorption by the impact absorption body is secured.

A vehicle safety device according to a second aspect of the present invention provided with an impact absorption unit, the impact absorption unit comprising: an impact absorption body having a elongated load input portion, a pair of legs each being coupled at one end to a different end in the longitudinal direction of the load input portion, and a support portion to which the other ends of the pair of legs are fixed such that contact and separation of each of the pair of legs in the longitudinal direction of the load input portion is regulated; a drive unit which can drive the impact absorption body in a direction of separation from the vehicle body; and a controller which, if the controller has predicted a collision with the collision object, controls the drive unit so that the impact absorption body is driven by the predetermined amount in the direction of separation from the vehicle body.

According to the above aspect, if the collision of the collision object with the load input portion is not predicted, the load input portion is located in the position close to the vehicle body. On the other hand, the controller, if it has predicted the collision of the collision object, controls the drive unit and moves the impact absorption body from the close position to the separated position. Hereby, an impact absorption stroke by which the load input portion of the impact absorption body can be displaced toward the vehicle body side is created. When the collision object collides with the load input portion of the impact absorption body, the impact energy is absorbed while the long load input portion is deflected. Here, this impact absorption body, since the relative displacement (contact and separation in the longitudinal direction of the load input portion) of the pair of legs each fixed to the support portion is regulated, can obtain, by deformation of the pair of legs (by deformation of a corner portion between the pair of legs and the load input portion), a good impact absorbing characteristic in which a peak load is suppressed. At this time, since the impact absorption stroke is created by the action of the drive unit before the collision as described above, favorable impact absorption by the impact absorption body is secured.

Thus, the vehicle safety device according to the above aspect can alleviate the collision load acting on the collision object.

In the above aspect, a configuration may be provided wherein the collision absorption body is supported so that one end side thereof can rotate with respect to the vehicle body; and the drive unit is controlled by the controller, and rotates the impact absorption body by an angle of 50° to 80° with respect to the vehicle body in a direction in which the other end side of the impact absorption body separates from the vehicle body.

According to the above aspect, the impact absorption stroke created by the action of the drive unit before the collision is given by an angular displacement of the impact absorption body with respect to the vehicle body. Since this angular displacement is 50° to 80°, the favorable impact absorption by the impact absorption body is secured.

In the above aspect, a configuration may be provided wherein the pair of legs is formed integrally with the load input portion, which is formed in the shape of a plate, by folding both ends in the longitudinal direction of the load input portion.

According to the above aspect, the both ends in the longitudinal direction of the long load input portion are formed in the folding shape, whereby the pair of legs continue integrally. Therefore, it is possible to obtain favorable impact absorption characteristics, such as the definite creation of a displacement area that suppresses an increase in a supporting collision load (>0), and which displaces to absorb impact energy.

In the above aspect, a configuration may be provided wherein, in the impact absorption body, the pair of legs is formed on one side in the plate thickness direction of the load input portion, and the impact absorption body is supported by the drive unit in a state where the support portion is positioned further to a vehicle body side than the load input portion.

According to the above aspect, the impact absorption body, since the pair of legs are fold from the both ends in the longitudinal direction of the load input portion to the same side in the plate thickness, is formed in the substantially U-shape which opens to the vehicle body side. Hereby, the impact absorption stroke is easily secured by the shape and state of the impact absorption body, and a better impact absorption characteristic can be obtained.

In the above aspect, a configuration may be provided wherein the impact absorption body is configured by providing plural load input portions in parallel in a direction which is orthogonal to the longitudinal direction of the load input portion and which is also orthogonal to the contact and separation direction with respect to the vehicle body.

According to the above aspect, since the impact absorption body is configured by including plural combinations of the load input portions arranging in parallel in the above direction and the pair of legs, the collision object that is long in the specified direction can be surely supported and the collision energy can be effectively absorbed.

In the above aspect, a configuration may be provided wherein the impact absorption unit comprises: a load input portion provided contactably and separably with respect to the vehicle body; a drive unit which can drive the load input portion in a direction of approaching the vehicle body; and a controller which, if the collision object has collided with the load input portion, controls the drive unit so as to generate a displacement area which suppresses an increase in a supported load with respect to an increase in displacement in the direction of collision of the collision object.

According to the above aspect, if the collision object has collided with the load input portion, the controller controls the drive unit to subject the load input portion to displacement toward the vehicle body side, whereby the collision energy can be absorbed while suppressing the increase in the supporting impact load accompanied by the increase in the displacement.

A vehicle safety device according to a third aspect of the invention provided with an impact absorption unit, the impact absorption unit comprising: a load input portion provided contactably and separably with respect to the vehicle body; a drive unit which can drive the load input portion in a direction of approaching the vehicle body; and a controller which, if a collision object has collided with the load input portion, controls the drive unit so that the load input portion is driven toward the vehicle body side while supporting a collision load.

According to the above aspect, if the collision object has collided with the load input portion, the controller controls the drive unit so that the load input portion is displaced toward the vehicle body side. Hereby, this vehicle safety device, during the absorption of the impact energy, obtains a displacement area which is displaced while suppressing an increase in a supporting collision load (, for example, so that the supporting load does not increase) and absorbs the impact energy, and restrains a high (peak) load from acting on the collision object during absorption of the impact energy.

Thus, in the vehicle safety device according to the above aspect, it is possible to alleviate the collision load which acts on the collision object.

In the above aspect, a configuration may be provided wherein the drive unit is configured so as to be capable of driving the load input portion in the direction of approaching the vehicle body and in the direction of separation from the vehicle body; and the controller controls the drive unit such that, if the controller has predicted a collision with the collision object, the load input portion is driven in the direction of separation from the vehicle body by a predetermined amount; and after collision of the collision object with the load input portion, the load input portion is driven in the direction of approaching the vehicle body.

According to the above aspect, if the collision of the collision object with the load input portion is not predicted, the load input portion is located in the position close to the vehicle body. On the other hand, the controller, if it has predicted the collision of the collision object with the load input portion, controls the drive unit and moves the load input portion from the position close to the vehicle position to the position apart from the vehicle body. Hereby, an impact absorption stroke by which the load input portion can be displaced toward the vehicle body side is created. The controller, when the collision object collides with the load input portion (when the controller detects that the collision object has collided with the load input portion), subjects the load input portion to displacement to the close position side (to the vehicle body side) by the drive force of the drive unit so that the collision load does not increase at least at a specified displacement area. Hereby, in the collision object, while the collision load (reaction force of the collision load) acting at least at the specified displacement area is suppressed, the collision energy is absorbed.

In the above aspect, a configuration may be provided wherein, based on a predicted value of at least one of a collision speed of a collision between the collision object and the vehicle body and the size of the collision object, the controller sets at least one of a drive amount of the load input portion when driven by the drive unit in the direction of separation from the vehicle body, a drive amount of the load input portion when driven by the drive unit in the direction of approaching the vehicle body from a position separated from the vehicle body, and a drive speed of the load input portion when driven by the drive unit in the direction of approaching the vehicle body from a position separated from the vehicle body.

According to the above aspect, the controller, according to the collision speed of the collision object with the vehicle body and the size of the collision object, that is, according to the collision energy and the like, sets the moving amount of the load input portion to the separated position side by the drive unit, the moving amount from the separated position to the close position (impact absorption stroke), and the moving speed (supporting load). Hereby, it is possible to perform impact absorption effectively according to the collision form or the kind of collision object.

In the above aspect, a configuration may be provided wherein the impact absorption unit is provided at a vehicle body front portion, thereby absorbing an impact energy of a collision object that collides with the vehicle body downward in a vertical direction of the vehicle.

According to the above aspect, the impact absorption unit (load input portion) is provided at the vehicle body front portion at least positioned upward in the vertical direction of the vehicle, so that the impact absorption unit can effectively absorb the impact energy of the collision object which has a velocity component in a downward direction upon collision.

In the above aspect, a configuration may be provided wherein may further comprising a guide unit which guides a collision object located on a road surface so that the collision object collides with the impact absorption unit.

According to the above aspect, firstly, the guide unit leads the collision object to the impact absorption unit so that the collision object collides with the impact absorption unit (load input portion) with the downward component of velocity. Hereby, the guide unit surely makes the collision object collide with the impact absorption unit, so that the impact energy can be effectively absorbed by the impact absorption unit.

In the above aspect, a configuration may be provided wherein the impact absorption unit extends in the vehicle width direction; and the guide unit is configured so as to guide the collision object to a center portion in the vehicle width direction of the impact absorption unit.

According to the above aspect, the leans device, if the contact position of the collision object is offset in the vehicle width direction from the center in the vehicle width direction of the impact absorption unit, leads the collision object to the center side in the vehicle width direction of the impact absorption unit. Hereby, regardless of the initial contact (collision) position of the collision object with the vehicle body, the collision energy can be effectively absorbed by the impact absorption unit.

In the above aspect, a configuration may be provided wherein the guide unit comprises: a pair of advance and retreat members which can independently attain a protrusion position, which protrudes from the vehicle body in the vehicle body front-rear direction, and a retreat position which is at a rear side in the vehicle body front-rear direction with respect to the protrusion position; a guide member which bridges the pair of advance and retreat members; a guide driving unit which can impart a drive force in the vehicle front-rear direction to the pair of advance and retreat members, independently; and a guide controller which controls the drive unit according to the collision position or the predicted collision position of the collision object in the vehicle width direction of the guide member.

According to the above aspect, in accordance with the protruding amount of the pair of advance and retreat members toward the vehicle body front, the angle of the lead member with respect to the vehicle width direction can be made different. The lead controller, according to the contact position between the lead member and the collision object, adjusts the protruding amount of the pair of advance and retreat member toward the vehicle body front, that is, the angle of the lead member, whereby the collision object can be led to the center in the vehicle width direction of the impact absorption unit.

In the above aspect, a configuration may be provided wherein may further comprising an expelling unit which if it is determined that the predicted collision position of the collision object or a guide position of the guide unit is offset outside a predetermined range of the impact absorption unit, expels the collision object toward the outside of the vehicle body in the vehicle width direction.

According to the above aspect, if it is determined that the collision object collides with the portion offset from the predetermined range of the impact absorption unit in the vehicle body, or that the collision object cannot be guided to the predetermined range (the center in the vehicle width direction) of the impact absorption unit even by the action of the guide unit (for example, if it is determined that expulsion is effective because the collision object cannot be guided to the predetermined range of the impact absorption unit), the expulsion device is actuated so that the collision object is expelled to the outside in the vehicle width direction.

A vehicle safety device according to a fourth aspect of the invention comprises an impact absorption portion which is displaced from a vehicle body while supporting a collision load, thereby absorbing collision energy of a collision object; and a reversion restraining unit which restrains the impact absorption portion from reverting after absorption of collision energy.

According to the above aspect, when the collision object collides with the impact absorption portion, the impact absorption portion is displaced to the vehicle body side while supporting the collision load, and the collision energy is absorbed by the integral of the load and the displacement. After the absorption of this energy, reversion of the impact absorption portion is restrained by the reversion restraining device. Therefore, it is prevented or effectively restrained that the collision object is separated (bounced back) from the vehicle body with the reversion of the impact absorption portion.

Thus, in the vehicle safety device according to the above aspect, while the collision load acting on the collision object is alleviated, it is possible to restrain the collision object from being separated from the vehicle body.

In the above aspect, a configuration may be provided wherein the impact absorption portion comprises an elastic member which deforms elastically while absorbing collision energy of the collision object; and the reversion restraining unit is configured so as to restrain the elastic member from reverting after absorption of the collision energy.

According to the above aspect, the elastic member of the impact absorption portion undergoes elastic deformation (deformation including elastic deformation) so that the collision portion with the collision object is displaced toward the vehicle body side, thereby to absorb the collision energy accompanied with the collision of the collision object. The reversion restraining device prevents the elastic member of the impact absorption portion from restoring from the state (deformation state) after the energy absorption. Hereby, in this vehicle safety device, it is prevented or effectively restrained that the collision object is separated (bounced back) from the vehicle body by the elastic reversion force of the elastic member.

In the above aspect, a configuration may be provided wherein the elastic member comprises a load input portion that is elongated in the vehicle width direction, and a pair of support portions which support both ends in the longitudinal direction of the load input portion, such that the respective ends can be angularly displaced in direction orthogonal to the longitudinal direction of the load input portion with respect to the vehicle body; and the reversion restraining unit comprises a mechanism which allows both ends in the longitudinal direction of the load input portion to be angularly displaced around the support portion together with a deflection deformation of the load input portion toward the vehicle body side, and which prevents both ends in the longitudinal direction of the load input portion from being angularly displaced around the support portion in the reversion direction of the load input portion after absorption of the collision energy in the collision with the collision object.

According to the above aspect, when the collision object collides with the load input portion of the elastic member, the load input portion is deflected to the vehicle body side while its both ends in the vehicle width direction makes angular displacement (including torsion deformation at the support portion) toward the side where the angular displacement is permitted by the above mechanism (for example, a ratchet mechanism, a one-way clutch, or the like) around the support portion, whereby the load input portion absorbs the collision energy accompanied by the collision of the collision object. After absorption of the collision load by this elastic member, the both ends in the longitudinal direction of the elastic member are prohibited from being angular displaced in the reversion direction around the support portions. Therefore, regarding the load input portion of the elastic member, the state after the energy absorption is kept. Hereby, in this vehicle safety device, it is prevented or effectively restrained that the collision object is separated (bounced back) from the vehicle body by the elastic reversion force of the elastic member.

In the above aspect, a configuration may be provided wherein the impact absorption portion is supported contactably and separably with respect to the vehicle body; and an impact absorption portion driving unit is further provided which drives the impact absorption portion to an impact absorption position separated from the vehicle body if a collision with the collision object is predicted.

According to the above aspect, since the impact absorption portion is separated from the vehicle body before the collision object collides, a sufficient absorption stroke of the collision energy can be secured.

In the above aspect, a configuration may be provided wherein the impact absorption portion driving unit drives the impact absorption portion toward the vehicle body side after the collision object collides with the impact absorption portion.

According to the above aspect, since the impact absorption portion is displaced toward the vehicle body side after the collision object collides with the impact absorption portion, a peak of the impact load acting on the collision object can be reduced (equalized within time).

EFFECT OF THE INVENTION

As described above, the vehicle safety device according to the invention has a good advantage that a collision load acting on a collision object can be alleviated.

BRIEF DESCRIPTION OF THE DRAWINGS

FIG. 3 It is a diagram showing a displacement-load characteristic of the impact absorption member configuring the vehicle safety device according to the first embodiment of the invention.

FIG. 6 It is a side view showing schematically a vehicle safety device according to a second embodiment of the invention.

FIG. 7 It is a side view showing schematically an unfolded state of the vehicle safety device according to the second embodiment of the invention.

FIG. 13 It is a diagram showing a control example in a soft mode by the ECU configuring the vehicle safety device according to the second embodiment of the invention.

BEST MODE OF IMPLEMENTING THE INVENTION

A vehicle safety device 10 according to a first embodiment of the invention will be described with reference to FIGS. 1 to 5. An arrow FR, an arrow UP, an arrow LH, and an arrow RH shown appropriately in each figure represent a front direction (running direction) in a vehicle body front-rear direction of an automobile 11 to which the vehicle safety device 10 is applied, an upper direction in a vehicle body up-down direction, a left direction if the automobile 11 faces to the direction of the arrow FR, and a right direction if the automobile 11 faces to the direction of the arrow FR, respectively. Namely, the arrow LH and the arrow RH show, based on the center in the vehicle width direction, the outside in the vehicle width direction, respectively.

Figure 1:
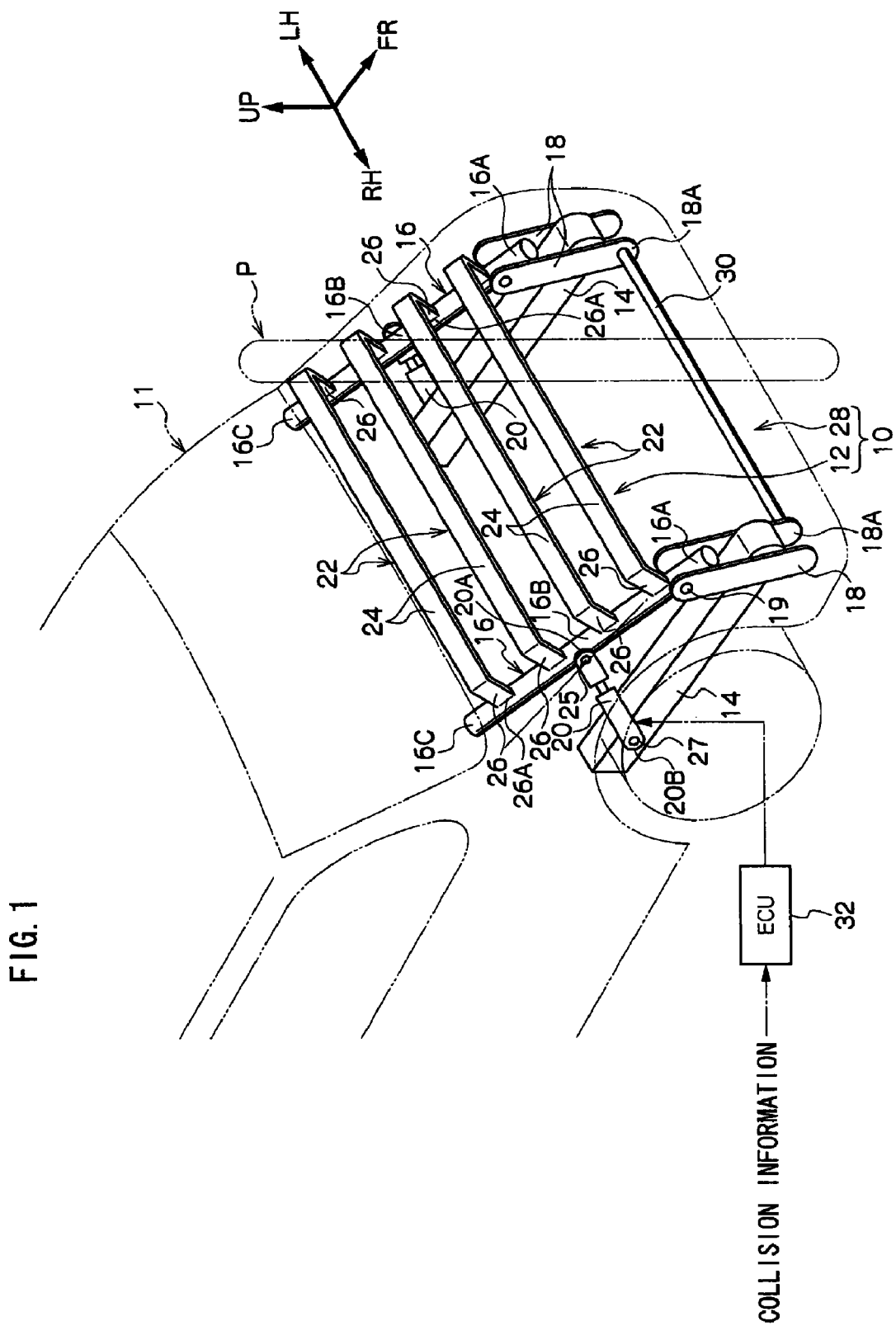
FIG. 1 It is a perspective view showing schematically a vehicle safety device according to a first embodiment of the invention.

In FIG. 1, the vehicle safety device 10 applied to the automobile 11 is shown in perspective. As shown in this figure, the vehicle safety device 10 includes an impact absorption structural body 12 as an impact absorption body, which is provided at the front portion of the vehicle body 11, and faces forward and upward (takes a backward slanting state with respect to a perpendicular surface). The impact absorption structural body 12 is supported in the above backward slanting state with respect to a front side member 14 forming a frame of the vehicle body front portion of the automobile 11. The vehicle safety device 10 will be concretely explained below.

The impact absorption structural body 12 has a pair of left and right side frames 16 as a support portion which is long in the vehicle body front-rear direction. In this embodiment, the pair of left and right side frames 16 is formed of a high-rigid member having a closed-section structure, such as a pipe material. For example, the sectional shape of each side frame 16 may be circular or rectangular. The pair of left and right side frames 16 are arranged on the upper side of their corresponding front side member 14, a front end portion 16A of each side frame 16 is supported pivotably around a pivot 19 along the vehicle width direction through a bracket 18 by the front end portion of the front side member 14, and an intermediate portion 16B in the longitudinal direction of each side frame 16 is supported by the front side member 14 through an actuator 20 as a drive unit.

In this support state, the pair of left and right side frames 16, so that each front end portion 16A is located in the lower position than the intermediate portion 16B in the longitudinal direction, that is, than a back end portion 16C, slants with respect to a horizontal surface (the vehicle body front-rear direction). An impact absorption member 22 as an impact absorption unit which is long in the vehicle width direction bridges the left and right side frames 16. In this embodiment, the plural (four in this embodiment) impact absorption members 22 spaced in parallel in the longitudinal direction of each side frame 16 are bridge the left and right side frames 16.

Each of the impact absorption member 22 includes a collision object receiving portion 24 as a load input portion which is long in the vehicle width direction, and a pair of legs 26 which are hung down from both ends in the longitudinal direction of the collision object receiving portion 24. In this embodiment, the collision object receiving portion 24 is formed in the shape of a plate along a parallel direction of the plural impact absorption members 22, and the pair of legs 26 continue to the collision object receiving portion 24 with the same width as if they were fold at a substantially right angle with the collision object receiving portion 24. Accordingly, the impact absorption member 22 is formed in the substantially U-shape opening downward seen from the end in its width direction.

Figure 2A:
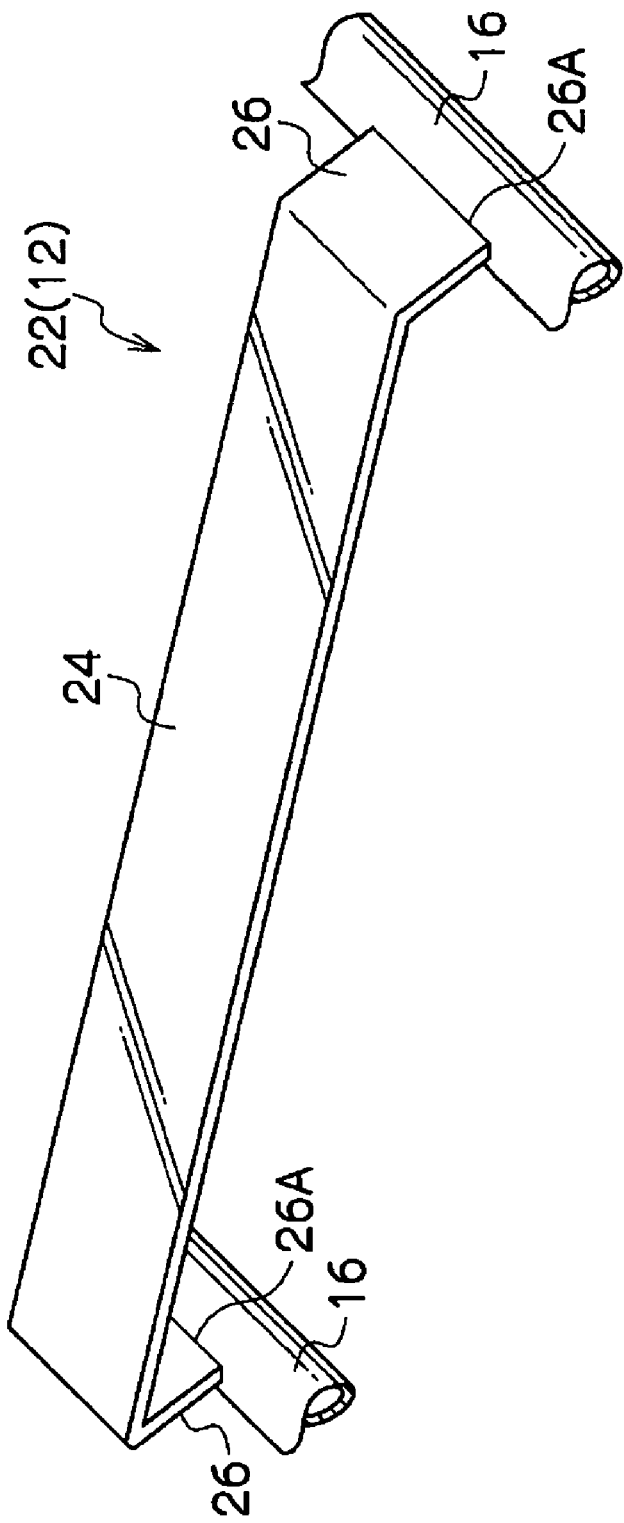
FIG. 2A It is a perspective view showing a no-load state of an impact absorption member configuring the vehicle safety device according to the first embodiment of the invention.
Figure 2B:
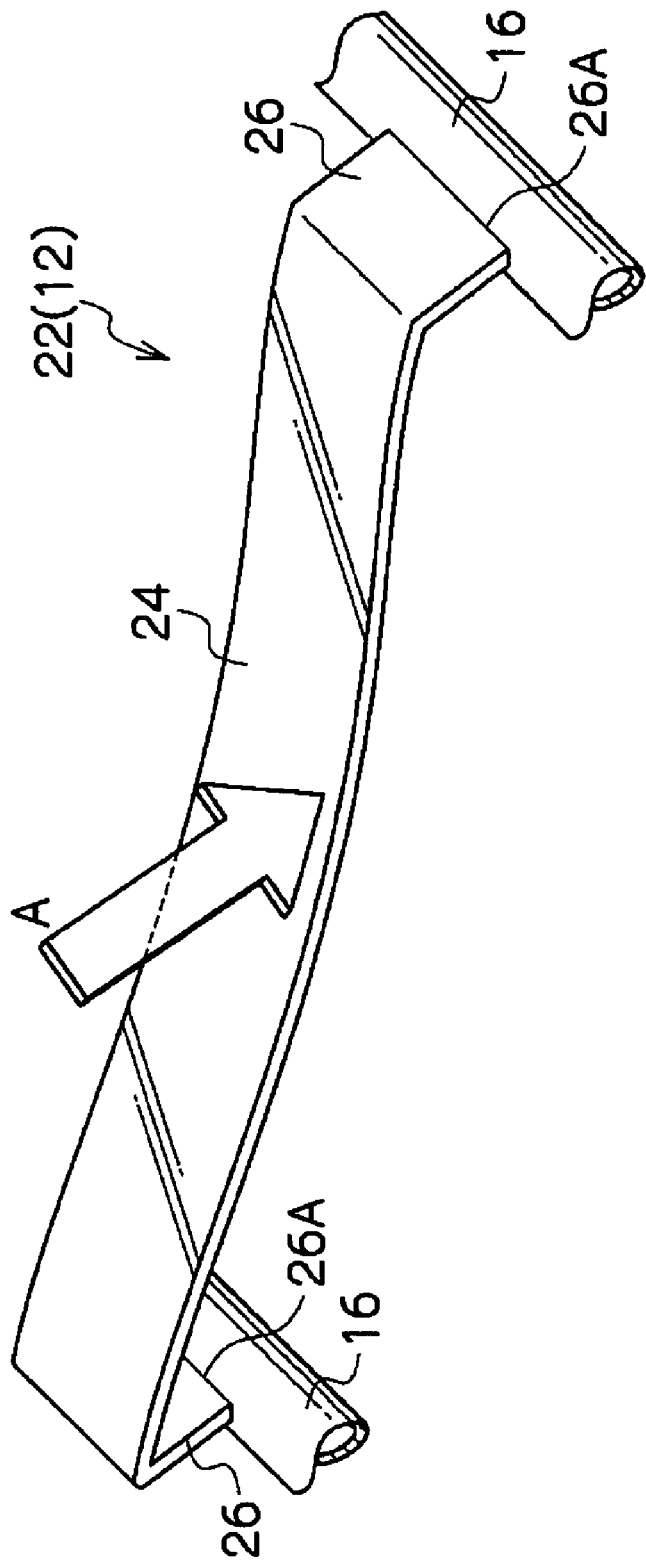
FIG. 2B It is a perspective view showing a deformation state of the impact absorption member configuring the vehicle safety device according to the first embodiment of the invention.

As shown also in FIG. 2A, in each of the impact absorption members 22, an end portion 26A on the opposite side to the collision object receiving portion 24 side of each leg 26 is fixed to the upper surface side of the side frame 16 located on the same side in the vehicle width direction as the leg side, and the impact absorption member 22 forms the collision absorption structural body 12 together with the pair of side frames 16. Therefore, the collision object receiving portion 24 of the impact absorption member 22 is located above the left and right side frames 16. In the impact absorption member 22 forming the substantially U-shape as described above, the pair of legs 26 are fixed to the side frames 16 so that the relative displacement (contact and separation mainly in the vehicle width direction) of the respective ends 26A is regulated and only the rotation around the axis in the longitudinal direction of the side frame 16 is permitted, whereby a displacement-load characteristic shown by a solid line in FIG. 3 is obtained if a forced displacement in the direction of an arrow A is applied to the center portion in the vehicle width direction of the collision object receiving portion 24 as shown in FIG. 2B.

Namely, each impact absorption member 22 is configured such that there is produced therein a displacement area B (soft area) where an increase in load is suppressed, accompanied by an increase in displacement (deflection) in the direction of the arrow A (the plate thickness direction) of each impact receiving portion 24. The ranges of load and displacement in this displacement area B can be appropriately set according to quality of material configuring the impact absorption member 22, and a dimensional shape of the impact absorption member 22 (the collision receiving portion 24 and the pair of legs 26). Further, the displacement-load characteristic of each impact absorption member 22 may be made different according to the installed position of the member 22.

Figure 4A:
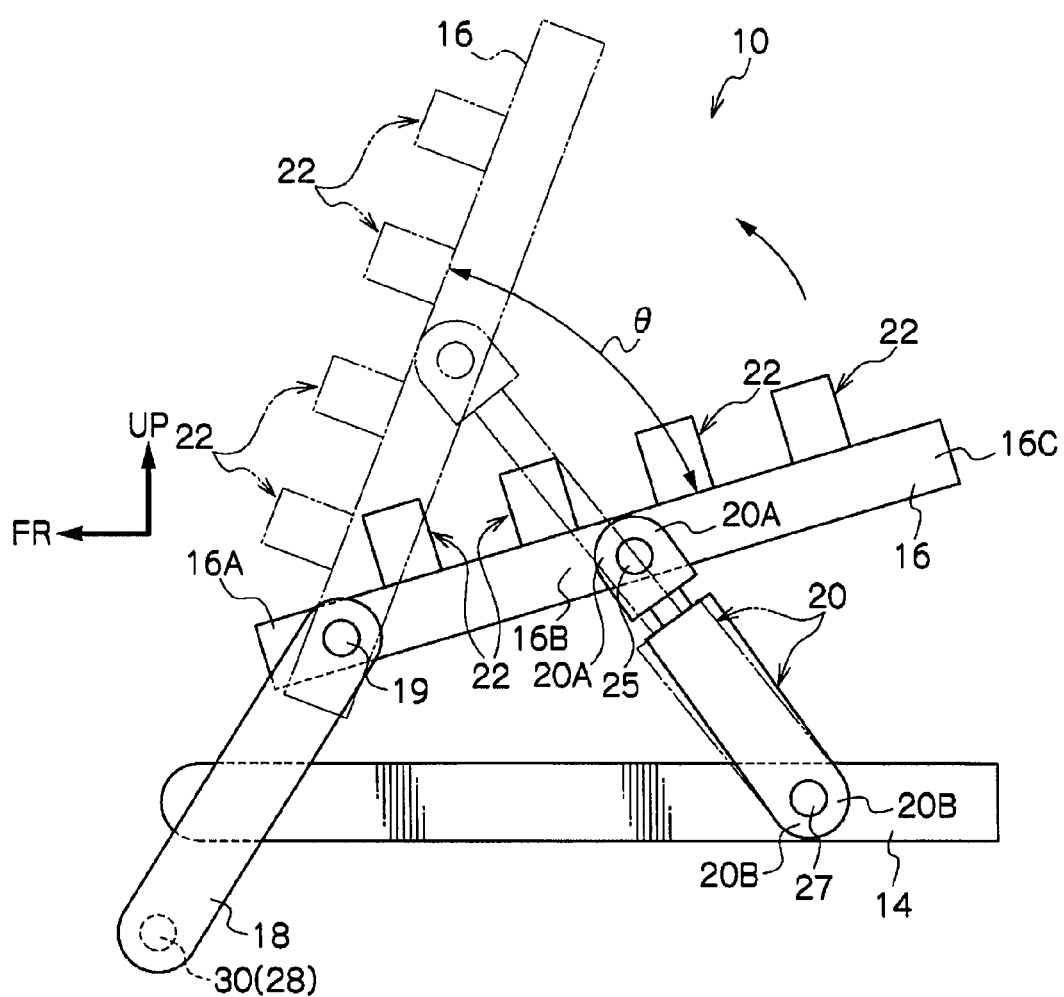
FIG. 4A It is a schematic diagram showing a displacement area of an impact absorption structural body configuring the vehicle safety device according to the first embodiment of the invention.

The left and right actuators 20 are configured so as to be capable of expanding and contracting in their longitudinal directions by for example, hydraulic pressure, air pressure, or electric power. An upper end 20A of the actuator 20 is supported by the side frame 16 pivotably around a pivot 25 located along the vehicle width direction, and a lower end 20B thereof is supported by the front side member 14 pivotably around a pivot 27 located along the vehicle width direction. Each actuator 20 takes usually a contracted state as shown in FIGS. 1 and 4A, and extends by actuation as shown by imaginary lines in FIG. 4A. By extension of these actuators, the impact absorption structural body 12 rotates around the pivot 19 so as to separate from the vehicle body, and the state of the impact absorption structural body 12 changes from a storage state (refer to FIG. 1) to a collision preparing state (refer to the imaginary lines in FIG. 4 and FIG. 5).

Figure 4B:
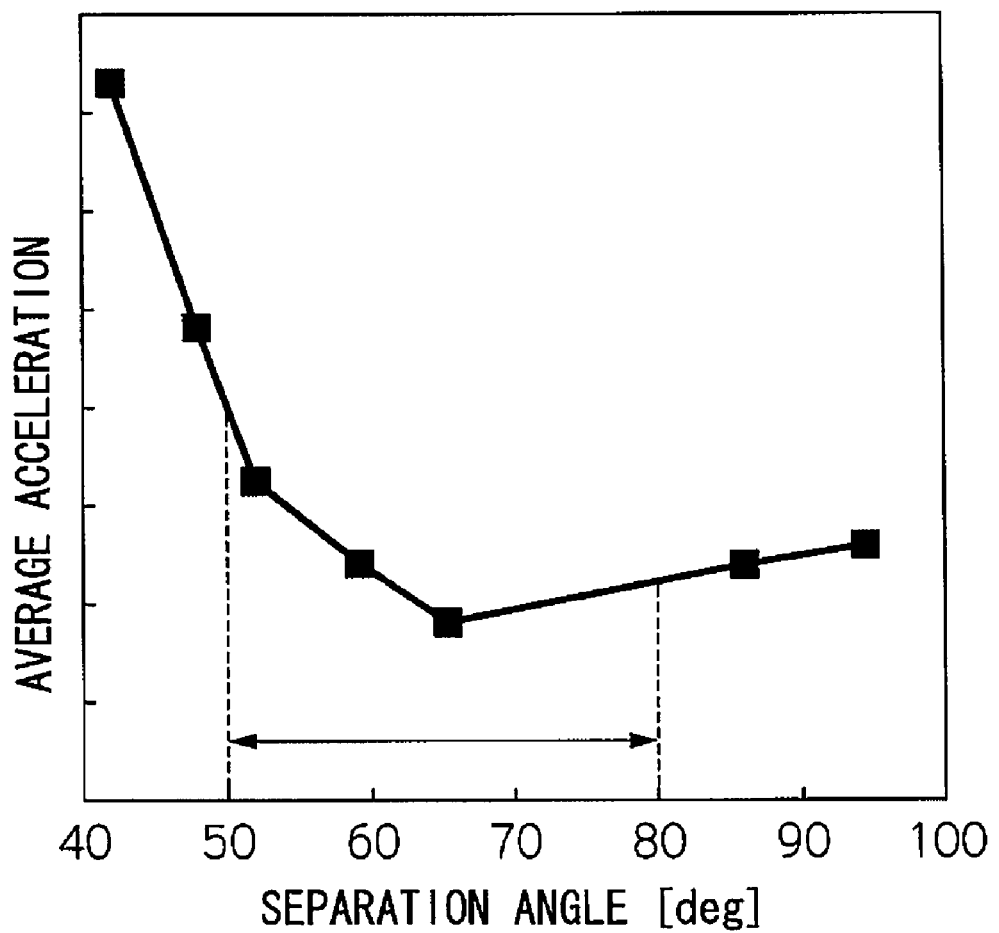
FIG. 4B It is a diagram for explaining an effective range of displacement of the impact absorption structural body configuring the vehicle safety device according to the first embodiment of the invention.

The collision preparing state is a state in which the collision absorption structural body 12 rotates around the pivot 19 by an angle θ from the storage state, and the angle θ is set in a range of about 50° to 80° in this embodiment. As shown in FIG. 4B, when the angle θ is in the range of about 50° to 80°, an average acceleration (value of integral) of the collision object is reduced, from which it is known that this angle range contributes to good energy absorption. It has been ascertained that the effective (optimum) range of this angle θ does not depend on the collision speed of the collision object with the impact absorption structural body 12, but is substantially constant.

Further, the vehicle safety device 10 includes an ECU 32 as a controller. As shown in FIG. 1, the ECU 32 is electrically connected to each actuator 20 (In FIG. 1, only connection to one actuator 20 is shown). Further, although illustration thereof is omitted, signals from vehicle sensors such as a millimeter-wave radar (distance sensor), a vehicle speed sensor, and a CCD camera (imaging device) are input to the ECU 32 directly or via another ECU.

On the basis of these information, the ECU 32 predicts collision of a collision object P. Since a method of such the prediction can use known methods, its description is omitted. The ECU 32, if it has predicted the collision of the collision object P, actuates each actuator 20. Accordingly, in the vehicle safety device 10, if ECU 32 has predicted the collision, the state of the impact absorption structural body 12 changes from the storage state from the collision preparing state.

For example, the above-described impact absorption structural body 12 may be arranged below (inside) an engine hood having the soft structure, and at least the portion except the both ends in the vehicle width direction of the collision object receiving portion 24 may be arranged, exposed on the engine hood. Further, a group of the collision object receiving portions 24 (impact absorption members 22) itself may be covered with a coated layer to form the engine hood. In this embodiment, the four impact absorption members 22 are arranged so as to equalize substantially the engine hood in plain view.

Further, the vehicle safety device 10 includes a bounce-up portion 28 as a guide unit. The bounce-up portion 28 is configured by bridging a bounce-up bar 30 between lower portions 18A of the left and right brackets 18 which are extended to the downside of the front side member 14. The bounce-up bar 30 is spaced apart from the road surface by the predetermined height at the front lower end portion of the automobile 11, and configured as apart in the automobile 11 which comes into first contact with the collision object on the road surface (as apart which receives firstly the load substantially). Accordingly, if a lower portion Pl of the collision object P which is long in the up-down direction has collided with the bounce-up bar 30 as shown in FIG. 1, the lower portion Pl of the collision object P is bounced up (scooped up), so that the collision object P is led so as to fling itself on the collision absorption structural body 12.

Next, operation of the exemplary embodiment will be explained.

In the automobile 11 to which the vehicle safety device 10 having the above configuration is applied, the ECU 32, if the ECU 32 has predicted that the collision object P collides with the front surface of the automobile 11 (has determined that probability of collision is equal to or larger than a threshold), each actuates actuator 20. Then, the actuators 20 expand respectively by the predetermined amount, and the state of the impact absorption structural body 12 changes, as shown in FIG. 5A, to the collision preparing state by this expansion.

Figure 5A:
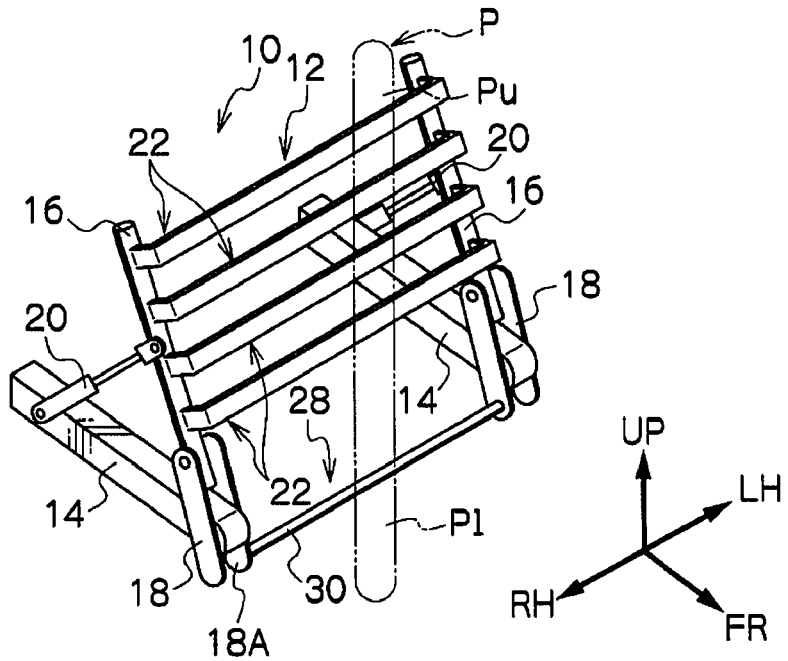
FIG. 5A It is a perspective view immediately before collision, showing an energy absorption process of a collision object by the vehicle safety device according to the first embodiment of the invention.
Figure 5B:
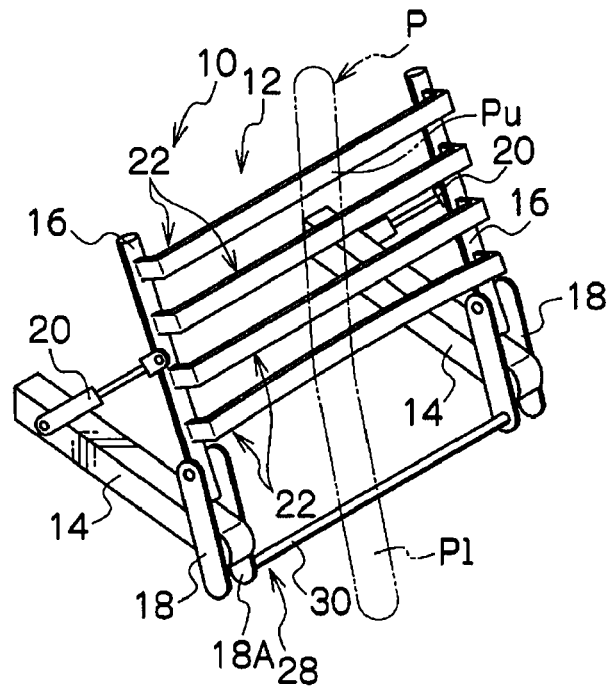
FIG. 5B It is a perspective view at the initial stage of the collision, showing the energy absorption process of the collision object by the vehicle safety device according to the first embodiment of the invention.

In this automobile 11, when the collision object P collides with the front surface side of the automobile 11, firstly, as shown in FIG. 5A, the bounce-up bar 30 of the bounce-up portion 28 comes into contact with the lower portion Pl of the collision object P, and the collision object P, as shown in FIG. 5B, is led onto the impact absorption structural body 12 (with a back-downward component of velocity) so that the lower portion Pl is scooped.

Figure 5C:
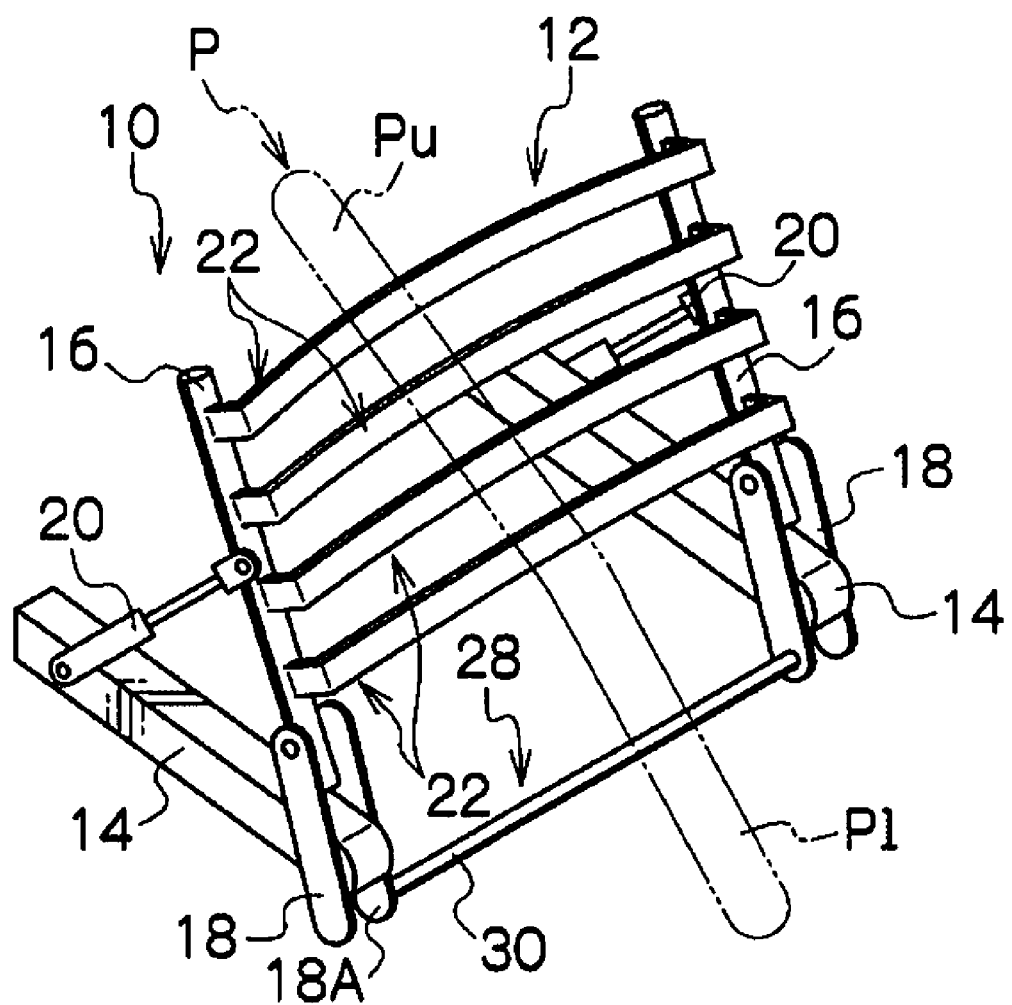
FIG. 5C It is a perspective view at the middle stage of the collision, showing the energy absorption process of the collision object by the vehicle safety device according to the first embodiment of the invention.

Then, the collision object P comes into contact with the collision object receiving portion 24 of each impact absorption member 22 configuring the impact absorption structural body 12. The impact absorption member 22, so that the collision object receiving body 24 is pressed mainly by a upper portion Pu of the collision object P, is deflected, as shown in FIG. 5C, to the downside (vehicle body side) in the thickness direction while supporting a collision load. Hereby, the impact energy in which the support load is integrated by displacement is absorbed by the impact absorption structural body 12.

Here, in the vehicle safety device 10, since the impact absorption structural body 12 is configured by the impact absorption member 22 which produces the displacement area B (refer to FIG. 3) that suppresses an increase in support load (>>0) accompanied by an increase in displacement, the collision object P comes into soft contact with the impact absorption structural body 12, and the impact energy is absorbed so that the collision object P is caught softly, whereby the collision object P is released from the collision state. Hereby, it is prevented that a large load (peak load) acts on the collision object P during absorption of the impact energy.

Further, in the vehicle safety device 10, since the impact absorption structural body 12 takes the collision preparing state before the collision with the collision object P, an impact absorption stroke by the impact absorption structural body 12 is secured enough. Hereby, the displacement of the impact absorption structural body 12 (collision object receiving portion 24, collision object P) is not regulated during the impact absorption, and a favorable impact absorption characteristic (soft characteristic shown in FIG. 3) of the impact absorption structural body 12 can be fully expressed.

Thus, in the vehicle safety device 10 according to the first embodiment of the invention, it is possible to alleviate the collision load acting on the collision object P. Namely, the collision object P can be protected from the collision, that is, collision safety performance improves for the collision object P.

Further, since the vehicle safety device 10 includes the bounce-up portion 28, the vehicle safety device 10 can lead the collision object P surely onto the impact absorption structural body 12 thereby to absorb the impact energy (protect the collision object P) satisfactorily as described above.

Next, other embodiments of the invention will be described. The basically same parts and portions as those in the above first embodiment or the aforementioned configuration are denoted by the same symbols as those in the above first embodiment or the aforementioned configuration, their description will be omitted, and their illustration representation can be omitted.

Second Embodiment

FIG. 6 shows schematically a storage state of a vehicle safety device 40 according to a second embodiment of the invention in a side view. FIG. 7 shows schematically an unfolded state of the vehicle safety device 40 in a side view. As shown in these figures, the vehicle safety device 40 is different, in that an impact absorption structure 42 as an impact absorption unit which can take a storage state and an unfolded state is provided, from the vehicle safety device 10 having the impact absorption structural body 12 fixed to the front side member 14.

Figure 8:
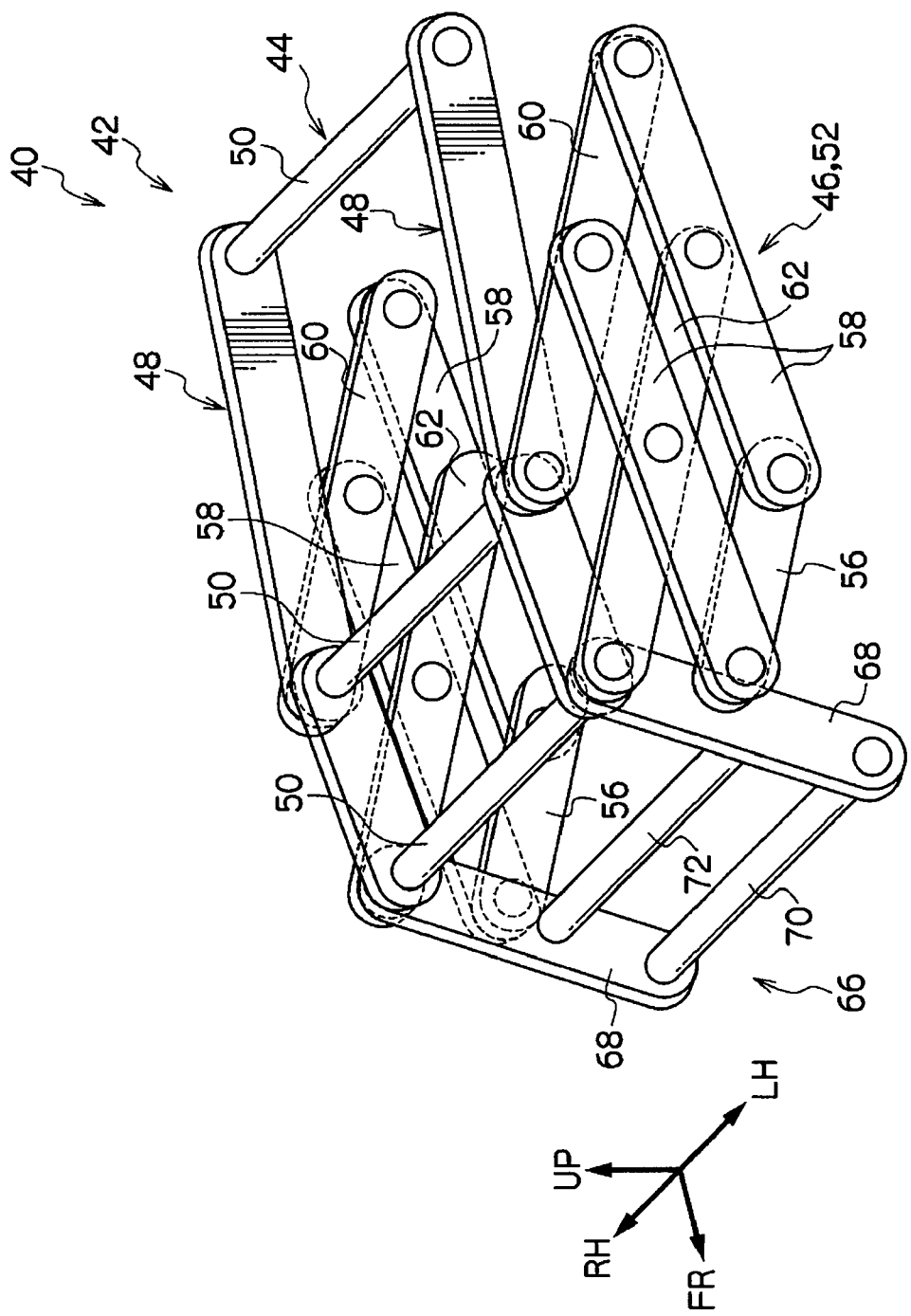
FIG. 8 It is a perspective view showing a storage state of the vehicle safety device according to the second embodiment of the invention.

As shown in FIGS. 6 and 8, the impact absorption structure 42 includes a collision object receiving portion 44 as a load input portion, and a drive mechanism 46 as a drive unit for supporting the collision object receiving body 44 with respect to a vehicle body and driving the collision object receiving body 44 between the storage state and the unfolded state.

The collision object receiving body 44 includes a pair of left and right side frames 48 extending in the front-rear direction, and a collision object receiving member 50 bridging between the pair of left and right side frames 48. The pair of left and right side frames 48 is formed by coupling a back frame 48B to a back end side of a front frame 48A which is long in the front-rear direction. In the embodiment, the front frame 48A and the back frame 48B are fixed to each other so as to form an obtuse angle with each other and so that the obtuse angle is kept constant. Accordingly, the pair of left and right side frames 48 may be configured respectively by a single member.

The collision object receiving members 50 are long in the width direction respectively, and bridging between the pair of left and right side frames 48 at the different portions in the front-rear direction of the frames 48. In this embodiment, three collision object receiving members 50 are provided at a front end, an intermediate portion (corner between the front frame 48A and the back frame 48B), and a back end between the pair of left and right side frames 48, respectively. Accordingly, the collision object receiving portion 44 is formed in a substantial partitioned rectangle shape in plan view (a the shape in which two rectangular frames are connected). Although illustration thereof is omitted, the collision object receiving portion 44 is stored (accommodated), so as to be capable of advancing and retreating, in a storage portion formed in the substantial partitioned rectangle shape in plan view, in an engine hood. This storage state is a state where the collision object receiving portion 44 takes the storage state (close position) as shown in FIG. 6.

Each collision object receiving member 50 configuring this impact absorption structure 42 is formed of material (for example, rubber material) which has flexibility that is deflectable and expandable and which has high strength. Hereby, the impact absorption structure 42 has the configuration in which the collision object receiving member 50 can be deflected without contacting and separating the pair of left and right side frames 48. Further, the engine hood may have soft structure to be coupled through the collision absorption structure 42 to the drive mechanism 46.

The drive mechanism 46 includes a quadric crank chain 52, and an actuator 54 which gives the drive force to the quadric crank chain 52. The quadric crank chain 52 includes a fixed link 56 which is fixed to the vehicle body, a pair of front and back intermediate links 58 which are coupled to front and back ends of the fixed link 56 pivotably around link shafts 52A and 52B, an upper output link 60 which is coupled to each upper end of the pair of intermediate links 58 pivotably around link shafts 52C and 52D, and a lower output link 62 which is coupled to each intermediate portion of the pair of intermediate links 58 pivotably around link shafts 52E and 52F. The fixed link 56, the upper output link 60, and the lower output link 62 are provided in parallel with one another, and the pair of front and back intermediate links 58 are provided in parallel with each other.

Regarding the upper output link 60, its leading end extended forward of the link shaft 52C that is a coupling point with the front intermediate link 58 is coupled to an intermediate portion in the longitudinal direction of the collision object receiving portion 44 (side frame 48) pivotably around a link shaft 52G. Regarding the lower output link 62, its leading end extended forward of the link shaft 52E that is a coupling point with the front intermediate link 58 is coupled to a front end portion in the collision object receiving portion 44 (side frame 48) pivotably around a link shaft 52H. In this embodiment, the link shafts 52G and 52H are arranged at the coupling portions of the side frame 48 to the collision object receiving members 50.

The actuator 54, in this embodiment, is a motor actuator (motor having a reduction gear), and is operated thereby to rotate the intermediate link 58 located on the back side of the fixed link 56 around the link shaft 52B. The actuator 54 can rotate normally and reversely. When the actuator 54 rotates normally, the intermediate link 58 is rotated in a direction of an arrow C in FIG. 6; and when the actuator 54 rotates reversely, the pair of front and back intermediate links 58 are rotated in a direction of an arrow D.

Figure 9:
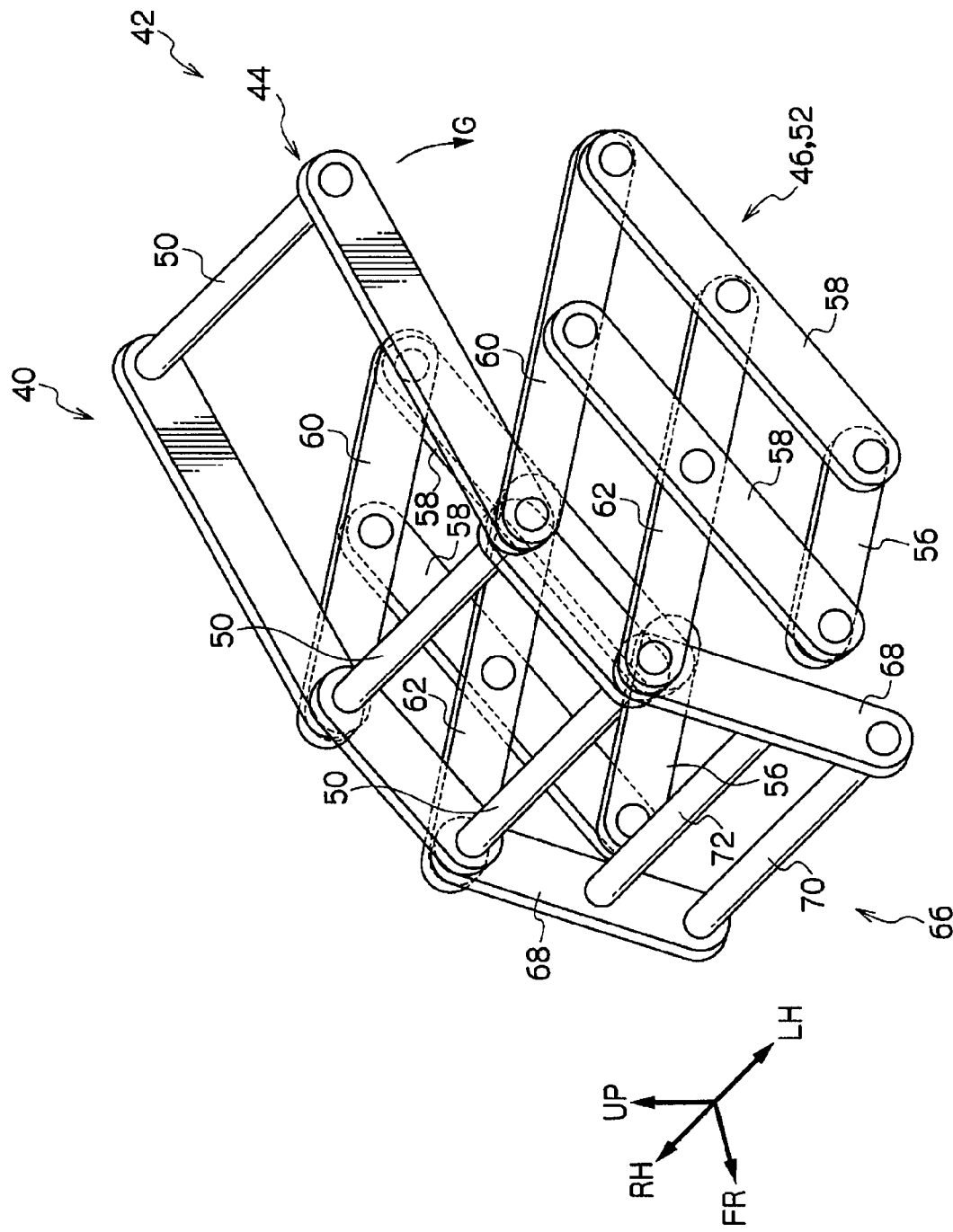
FIG. 9 It is a perspective view showing an unfolded state of the vehicle safety device according to the second embodiment of the invention.

When the actuator 54 is rotated normally from the storage state of the collision object receiving portion 44 shown in FIGS. 6 and 8, the collision object receiving portion 44 moves from the storage state to an direction of an arrow E as shown in FIGS. 7 and 9, and the state of the collision object receiving portion 44 changes to the unfolded state (separated position). The unfolded state may be set as a predetermined state with respect to the vehicle body. However, in this embodiment, the unfolded state can be adjusted to a predetermined state according to the rotational amount of the actuator 54. Further, in the impact absorption structure 42, by rotating the actuator 54 reversely from the unfolded state, the collision object receiving portion 44 is displaced to a reversion side to the storage state, that is, to the vehicle body side. Further, as shown in FIG. 6, the impact absorption structure 42 includes an ECU 64 as a controller which controls the actuator 54. The control of this ECU 64 will be described later.

Further, as shown in FIGS. 6 to 9, the vehicle safety device 40 includes a bounce-up mechanism 66 as a guide unit. The bounce-up mechanism 66 includes a pair of left and right swing arms 68 as an advance and retreat member, of which upper ends are independently supported pivotably by the pair of left and right side frames 48; a bounce-up bar 70 as a lead member, which is bridging between the lower ends of the pair of left and right swing arms 68, a coupling bar 72 which is bridging between the intermediate portions in the up-down direction of the pair of left and right swing arms 68; and a pair of actuators 74 (only one is shown in FIG. 6) as a lead driving member for driving the rotation of the pair of the left and right swing arms 68 independently.

The bounce-up bar 70 and the coupling bar 72 are respectively formed of material (for example, rubber material) which has flexibility that is deflectable and expandable and which has high strength. Regarding the bounce-up bar 70, the state shown in FIGS. 6 and 8 is a storage state, and the state shown by imaginary lines in FIG. 6 is a bounce-up state.

Figure 10A:
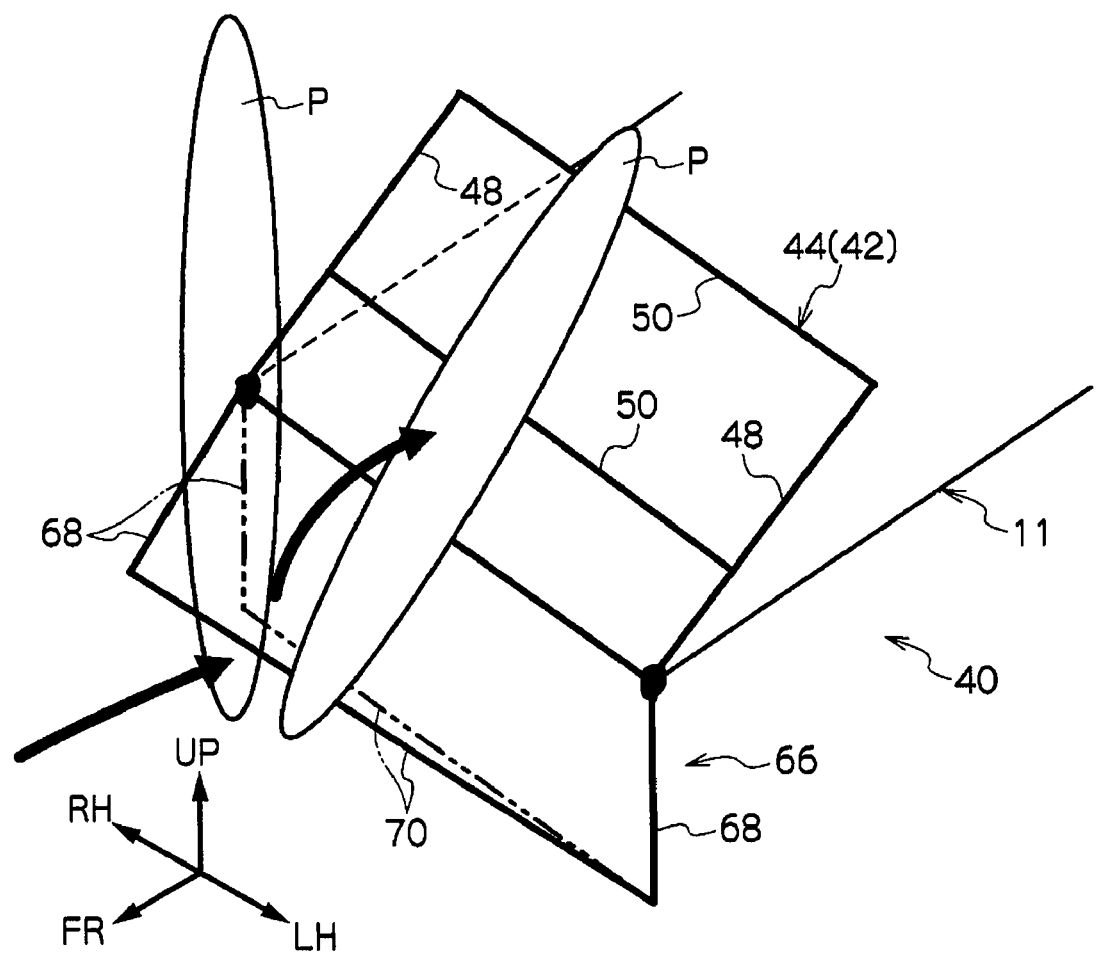
FIG. 10A It is a perspective view showing an operating state as a guide unit of a bounce-up mechanism configuring the vehicle safety device according to the second embodiment of the invention.
Figure 10B:
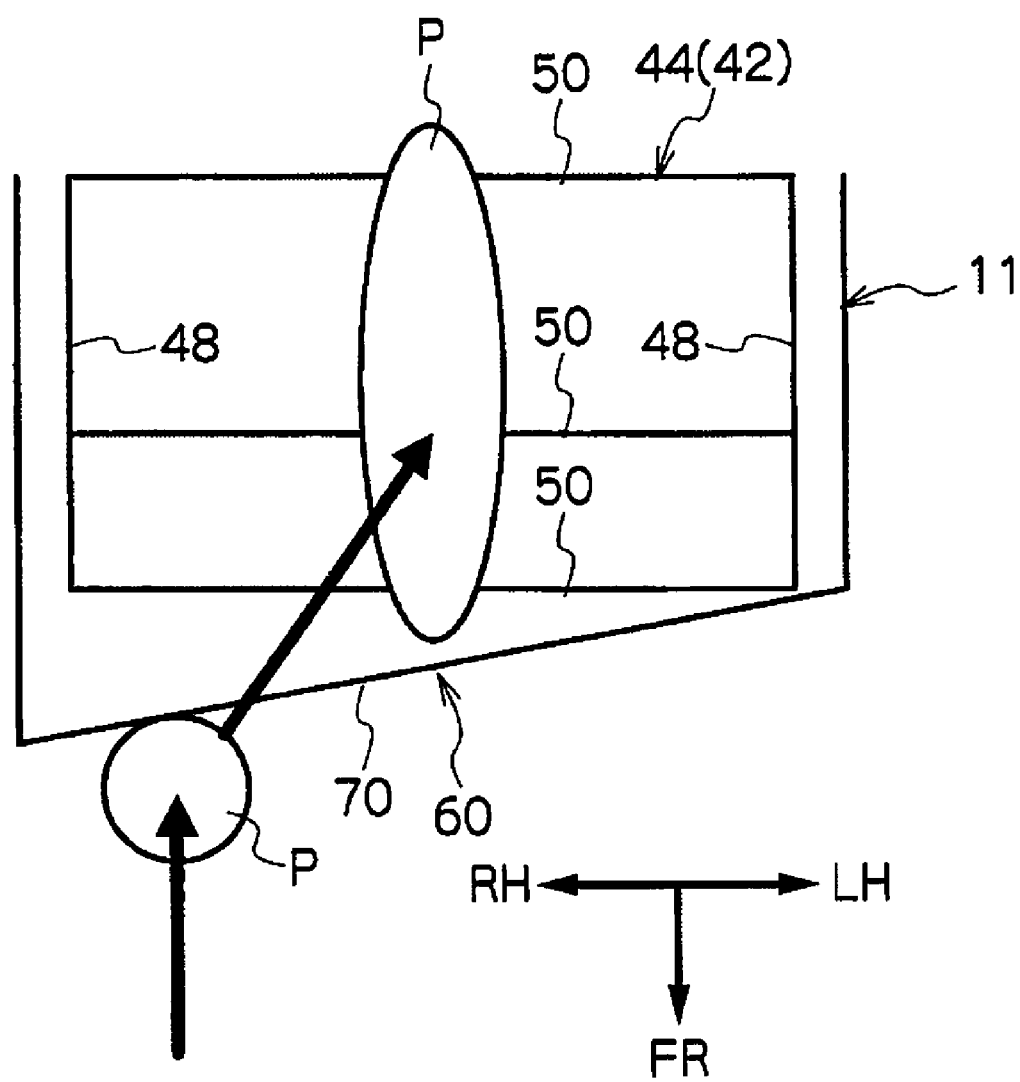
FIG. 10B It is a plan view showing the operating state as the guide unit of the bounce-up mechanism configuring the vehicle safety device according to the second embodiment of the invention.

The bounce-up mechanism 66 rotates the pair of left and right swing arms 68 in a direction of an arrow F and moves (protrudes) the bounce-up bar 70 forward, thereby to bounce up (scoop) a lower portion Pl of a collision object P and lead (bounce up) the collision object P onto the collision object receiving portion 44. Further, the bounce-up mechanism 66 makes the rotational amount of the left and right swing arms 68 different, whereby the bounce-up bar 70 can be moved forward at a state slant with respect to the vehicle width direction in plane view. Hereby, if the collision object P comes contact with the bounce-up bar 70 in an offset state from the center portion in the width direction, the swing arm 68 on the offset side (collision side) is rotated larger in the direction of the arrow F than the swing arm 68 on the opposite side, whereby the collision object P can be led to the center portion in the width direction of the collision receiving portion 44 as shown in FIGS. 10A and 10B.

Figure 11A:
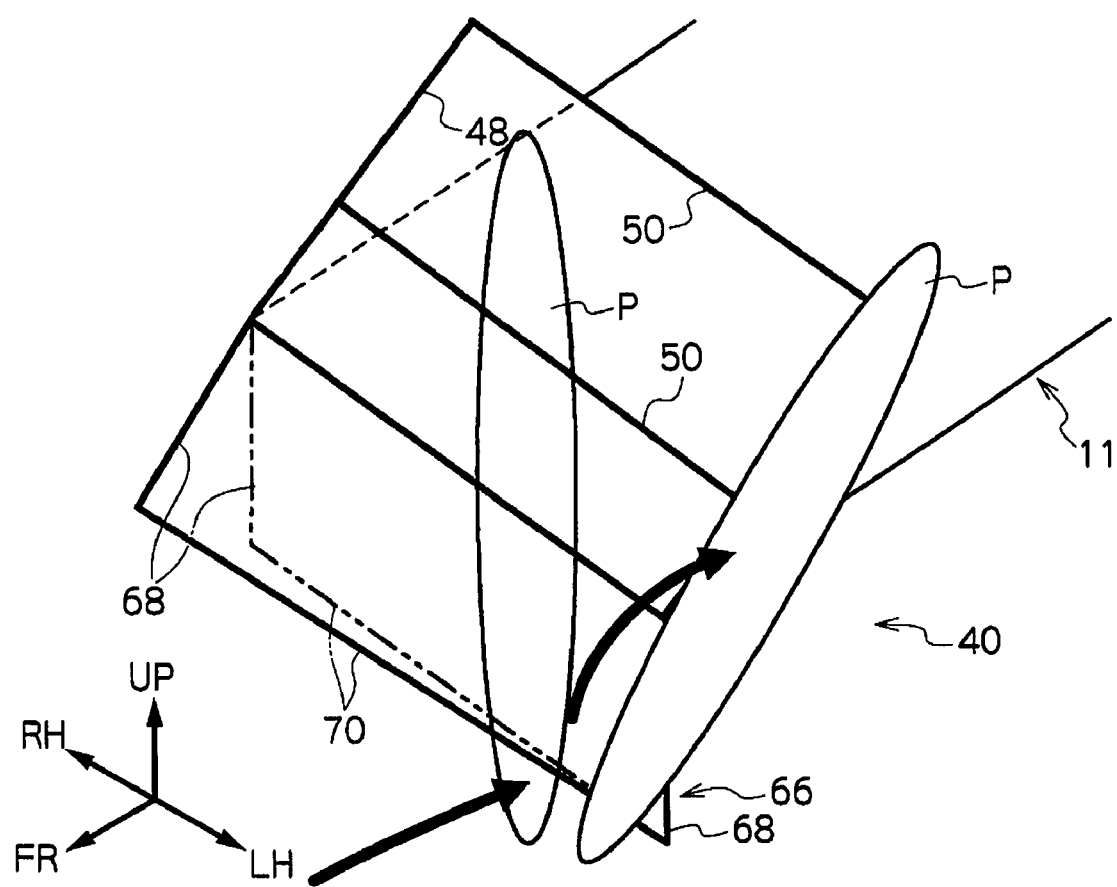
FIG. 11A It is a perspective view showing an operating state as an expelling unit of the bounce-up mechanism configuring the vehicle safety device according to the second embodiment of the invention.
Figure 11B:
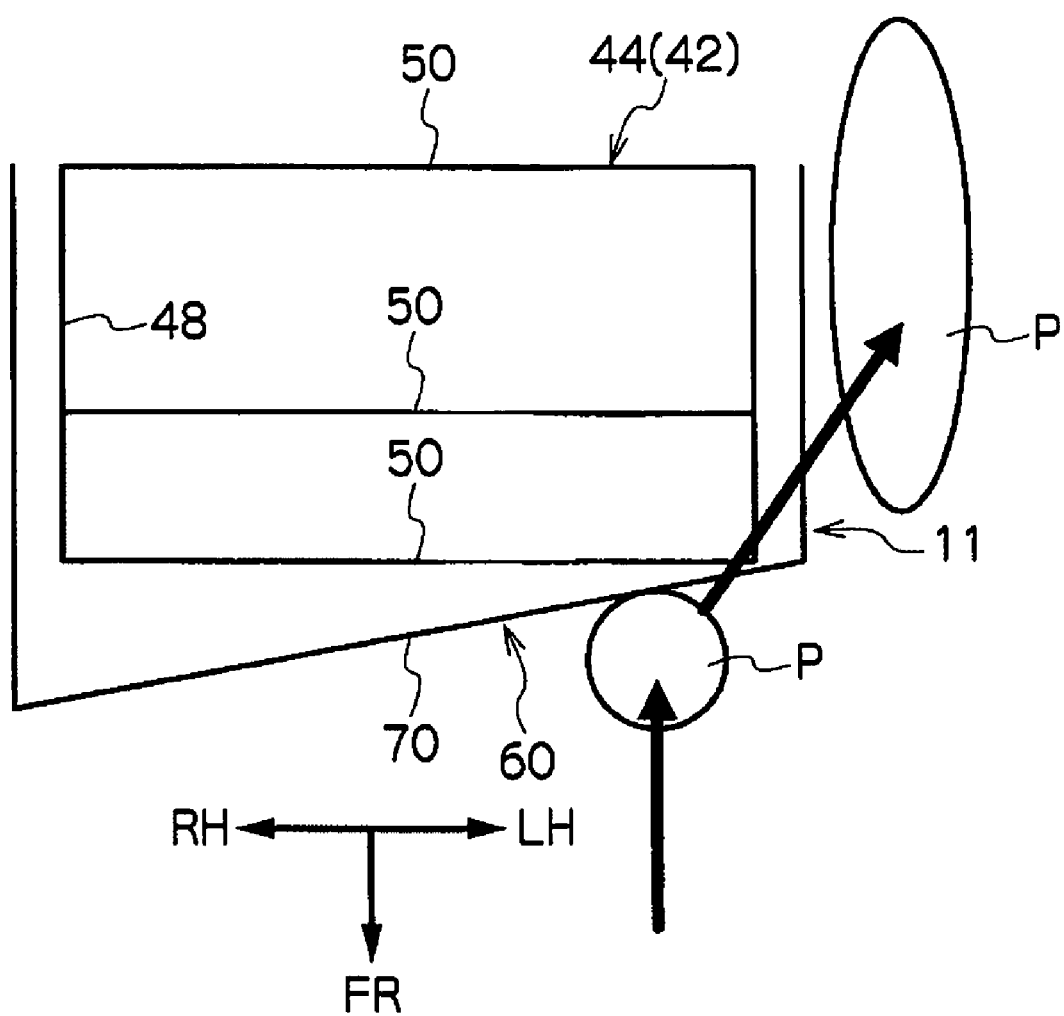
FIG. 11B It is a plan view showing the operating state as the expelling unit of the bounce-up mechanism configuring the vehicle safety device according to the second embodiment of the invention.

Further, the bounce-up mechanism 66, by rotating the swing arm 68 on the opposite side (reverse collision side) larger in the direction of the arrow F than the swing arm 68 on the offset side, can lead (eject) the collision object P to the outside in the width direction of the automobile 11 as shown in FIGS. 11A and 11B. Namely, in this embodiment, the bounce-up mechanism 66 functions also as an expelling unit in the invention.

In the bounce-up mechanism 66, the operation of each actuator 74 is controlled by the ECU 64 as a lead controller. Namely, in the vehicle safety device 40, the controller for the impact absorption structure 42 and the controller for the bounce-up mechanism 66 are made common. The ECU, as shown in FIG. 6, is electrically connected to the actuator 54 and the pair of actuators 74. Further, although illustration thereof is omitted, signals from vehicle sensors such as a millimeter-wave radar (distance sensor), a vehicle speed sensor, and a CCD camera (imaging device) are input to the ECU 64 directly or via another ECU.

On the basis of these information, the ECU 64 predicts and detects whether a collision is predicted, whether the collision is unavoidable, the collision speed, and the size of a collision object. Since a prediction and detection method of them can use known methods, its description is omitted. Further, in this embodiment, the ECU 64, on the basis of the above information, predicts and detects whether a predicted collision position of the collision object P is or is not offset from the center portion in the vehicle width direction (predicts and detects an offset amount), and whether the collision object P that collides in an offset state can be led to the center portion in the vehicle width direction of the collision object receiving portion 44 by the bounce-up mechanism 66. Further, the ECU 64, on the basis of results of the above prediction and detection, controls the actuator 54 and the pair of actuators 74. This control will be described later together with the operation of this embodiment.

Figure 12:
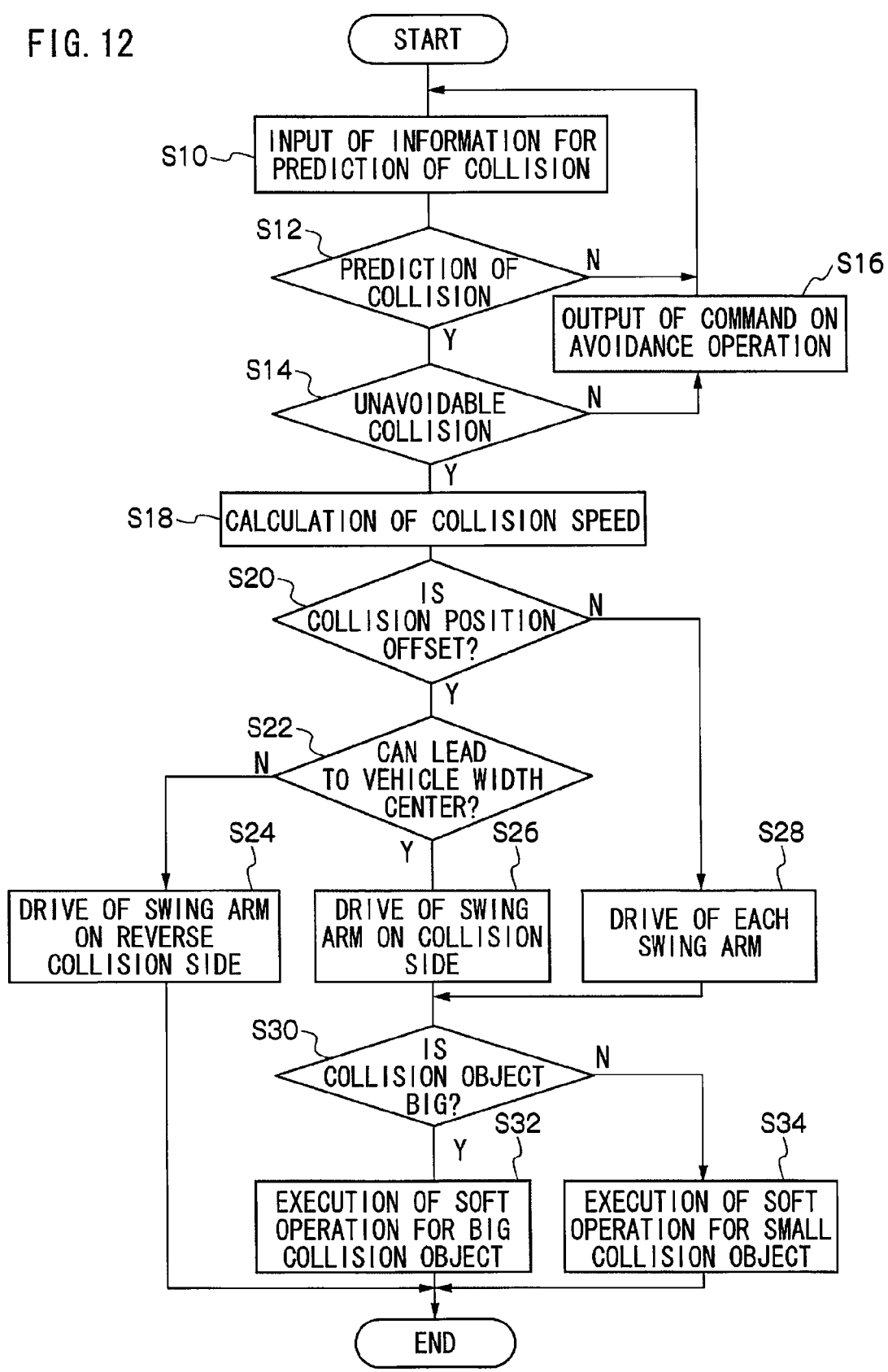
FIG. 12 It is a flowchart showing a control flow of ECU configuring the vehicle safety device according to the second embodiment of the invention.

Next, the operation of the second embodiment will be described with reference to a flowchart shown in FIG. 12.

In the vehicle safety device 40 having the above configuration, the ECU 64 inputs information from the sensors in a step S10, and determines whether collision (front collision) is predicted in a step S12. If the collision is not predicted, the ECU 64 returns to the step S10. On the other hand, if the collision is predicted, the ECU 64 proceeds to a step S14 and determines whether the collision is unavoidable. If the ECU 64 determines that the collision is not unavoidable, the ECU 64 proceeds to a step S16, outputs an command of avoidance operation, and returns to the step S10. Till the ECU 64 determines in the step S12 that the collision is not predicted (the collision has been avoided) or the ECU 64 determines in the step S14 that the collision is unavoidable, a loop passing through the step S16 is repeated. As the collision avoidance operations, there are actuation of the alarm which urges a driver on brake operation or steering, automatic (forced) braking, automatic (forced) steering, and the like.

If the ECU 64 determines in the step S16 that the collision is unavoidable, the ECU 64 proceeds to a step S18, calculates the collision speed, and thereafter proceeds to a step S20. In the step S20, the ECU 64 determines whether the predicted collision position of the collision object P is offset from the center in the vehicle width direction. If the ECU 64 determined that the predicted collision position of the collision object P is offset, the ECU 64 proceeds to a step S22, and determines whether the collision object P can be led to the center portion in the vehicle width direction.

If the ECU 64 determined in the step S22 that the collision object P cannot be led to the center portion in the vehicle width direction (and ejection is effective), the ECU 64 proceeds to a step S24, and actuates the pair of actuators 74 so that the swing arm 68 on the reverse collision side of the collision object P rotates larger than the swing arm 68 on the collision side. Hereby, as shown in FIGS. 11A and 11B, the bounce-up bar 70 takes a slant state where the forward protrusion amount on the offset side of the collision object P in the vehicle width direction is smaller than the protrusion amount on the opposite side. When the collision object P comes in contact with the bounce-up bar 70, the collision object P is led the outside in the vehicle width direction of the automobile 11. After execution of a step S24, the ECU 64 completes the control.

On the other hand, if the ECU 64 determined in the step S22 that the collision object P can be led to the center portion in the vehicle width direction, the ECU 64 proceeds to a step S26, and actuates the pair of actuators 74 so that the swing arm 68 on the collision side of the collision object P rotates larger than the swing arm 68 on the opposite side. Hereby, as shown in FIGS. 10A and 10B, the bounce-up bar 70 takes a slant state where the offset side of the collision object P in the vehicle width direction is protruded forward more largely than the opposite side. When the collision object P comes in contact with the bounce-up bar 70, the collision object P is led to the center portion in the vehicle width direction on the collision object receiving portion 44.

On the other hand, if the ECU 64 determined in the step S20 that the predicted collision position of the collision object P is not offset, ECU 64 proceeds to a step S28, and rotates the pair of left and right swing arms 68 equally. When the collision object P comes in contact with the center portion in the vehicle width direction of the bounce-up bar 70, the collision object P is led to the center portion in the vehicle width direction on the collision object receiving portion 44.

After execution of the step S26 or the step S28, the ECU 64 proceeds to a step S30. In the step S30, the ECU 64 determines the size of the collision object. If the ECU 64 determined that the size of the collision object is big, the ECU 64 proceeds to a step S32, executes a soft mode for a big collision object according to the collision speed calculated in the step S18. If the ECU 64 determined that the size of the collision object is not big, the ECU 64 proceeds to a step S34, and executes a soft mode for a small collision object according to the collision speed calculated in the step S18.

Here, in a process in which the impact absorption structure 42 is displaced to absorb the impact energy while supporting the collision load of the collision object P that has collided with the collision object receiving portion 44, the soft mode is an operation of driving the collision receiving portion 44 from the unfolded state to the storage state side (in the direction shown by the arrow G in FIGS. 7 and 8) by the drive force of the actuator 54 (actively), so that a displacement area B (refer to FIG. 3) which suppresses the increase in supporting load (>>0) accompanied by the increase in displacement is produced.

The ECU 64, in the soft mode for the big collision object, gives the control variable to the actuator 54 (drive mechanism 46) as shown by a solid line in FIG. 13 (performs feedforward control). On the other hand, in the soft mode for the small collision object, the ECU 64 gives the control variable to the actuator 54 as shown by a dashed line in FIG. 13. The control variable shown in FIG. 13 is an example. The ECU 64 stores plural control patterns (dynamic characteristics of the collision object P) according to collision patterns (collision speed in this embodiment), and selects the control pattern according to the collision speed calculated in the step S18.

Figure 14A:
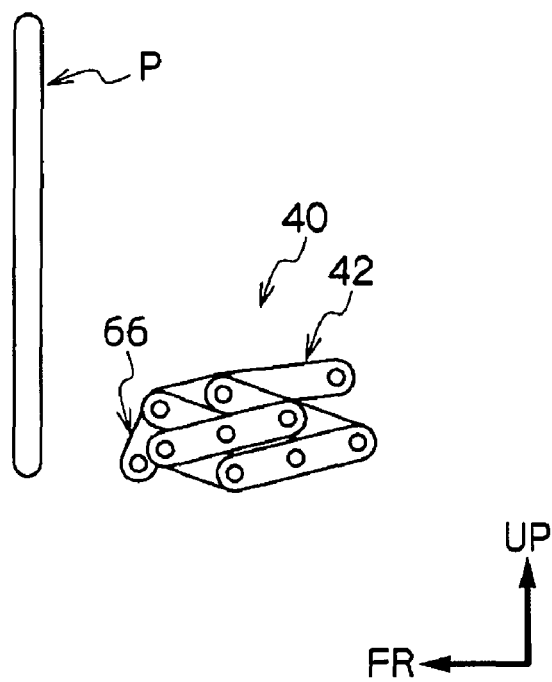
FIG. 14A It is a side view immediately before collision, showing an energy absorption process of a collision object by the vehicle safety device according to the second embodiment of the invention.
Figure 14B:
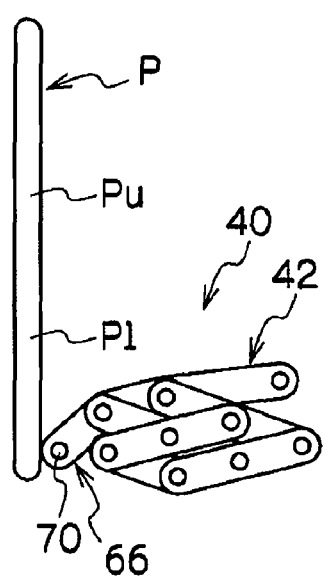
FIG. 14B It is a side view in a bounce-up state of the collision object by the bounce-up mechanism, showing the energy absorption process of the collision object by the vehicle safety device according to the second embodiment of the invention.

Firstly, the operation from the state immediately before the collision object P collides to execution of the soft mode for the big collision object will be described with reference to FIGS. 14 and 15. If the collision object P approaches the vehicle safety device 40 (automobile 11) as shown in FIG. 14A, and it is determined that the collision is unavoidable, the ECU 64 actuates the bounce-up mechanism 66 as shown in FIG. 14B, and bounces up the lower portion Pl of the collision object P by device of the bounce-up bar 70. Next, the ECU 64 starts the soft mode for the big collision object.

Figure 14C:
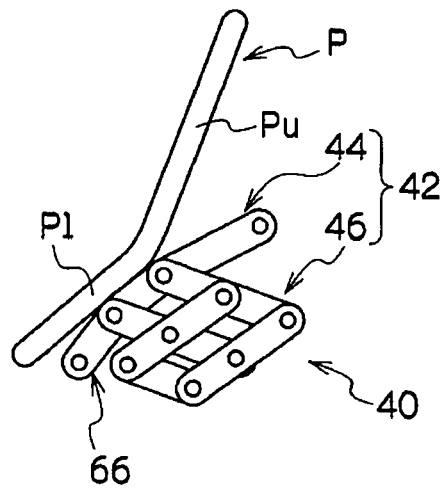
FIG. 14C It is a side view at the initial stage of the collision, showing the energy absorption process of the collision object by the vehicle safety device according to the second embodiment of the invention.
Figure 14D:
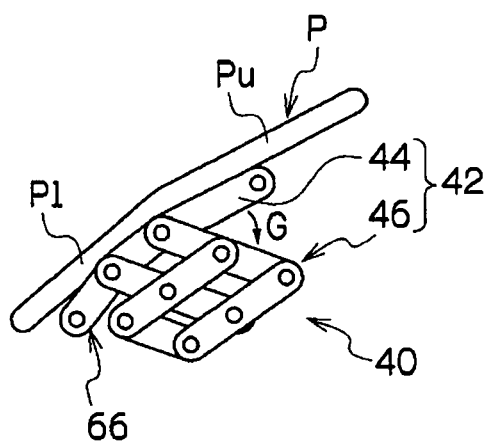
FIG. 14D It is a side view when the soft mode is started at the middle stage of the collision, showing the energy absorption process of the collision object by the vehicle safety device according to the second embodiment of the invention.
Figure 14E:
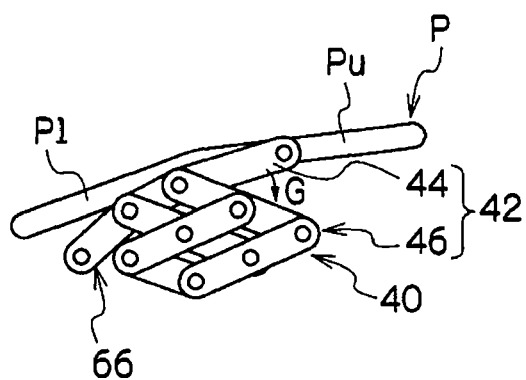
FIG. 14E It is a side view during execution of the soft mode, showing the energy absorption process of the collision object by the vehicle safety device according to the second embodiment of the invention.
Figure 15A:
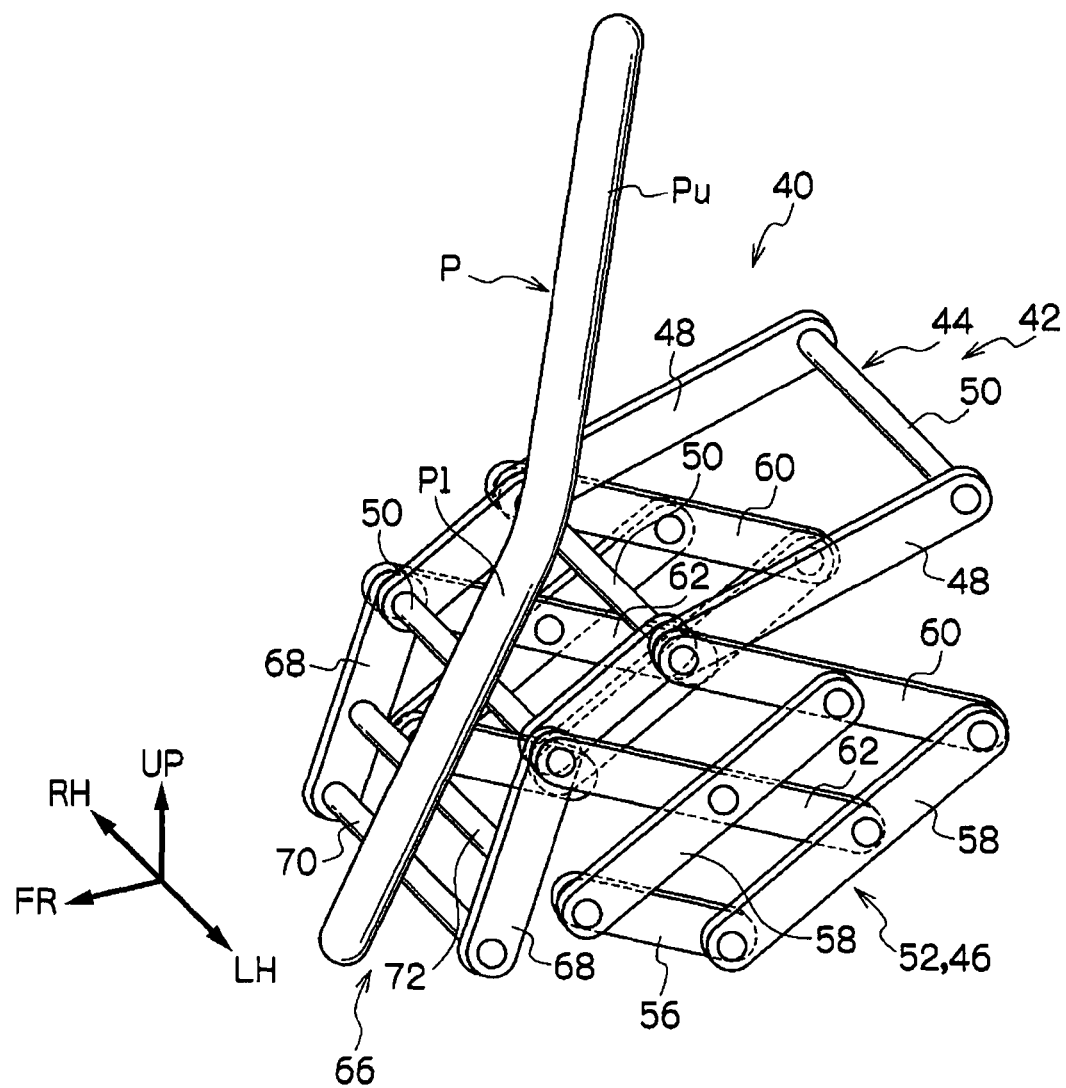
FIG. 15A It is a perspective view of a collision preparing state, showing an energy absorption process of a big collision object by the vehicle safety device according to the second embodiment of the invention.
Figure 15B:
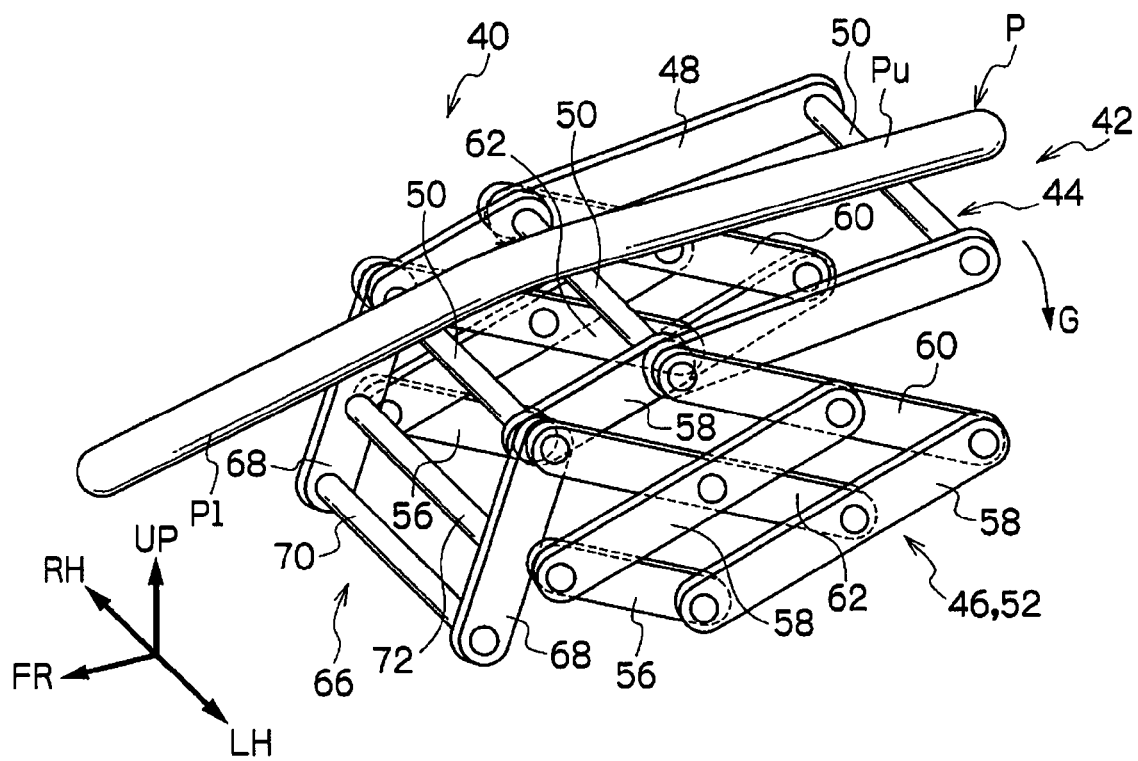
FIG. 15B It is a side view during execution of the soft mode, showing the energy absorption process of the big collision object by the vehicle safety device according to the second embodiment of the invention.

Specifically, the ECU 64, before the collision object P collides with the collision object receiving portion 44, rotates the actuator 54 normally, and drives the collision object receiving portion 44 in the unfolded state (collision preparing position). The collision object P, as shown in FIGS. 14C and 15A, collides with the collision object receiving portion 44 (the center portion in the vehicle width direction of the collision object receiving portion 44) located in the unfolded state. Further, as shown in FIG. 14D, over time, the upper portion Pu of the collision object P begins to collide by falling on the collision object receiving portion 44. Thereupon, the ECU 64 rotates the actuator 54 reversely, and moves the collision object receiving portion 44 to the storage state side as shown in FIG. 14(E) and FIG. 15B. Hereby, an increase in collision load (reaction force) acting on the collision object P during absorption of the impact energy, that is, on the collision object P due to the movement of the collision object receiving portion 44 to the storage state side, is suppressed, and the impact energy can be absorbed at a substantially constant load similarly to the case shown in FIG. 3.

Figure 16:
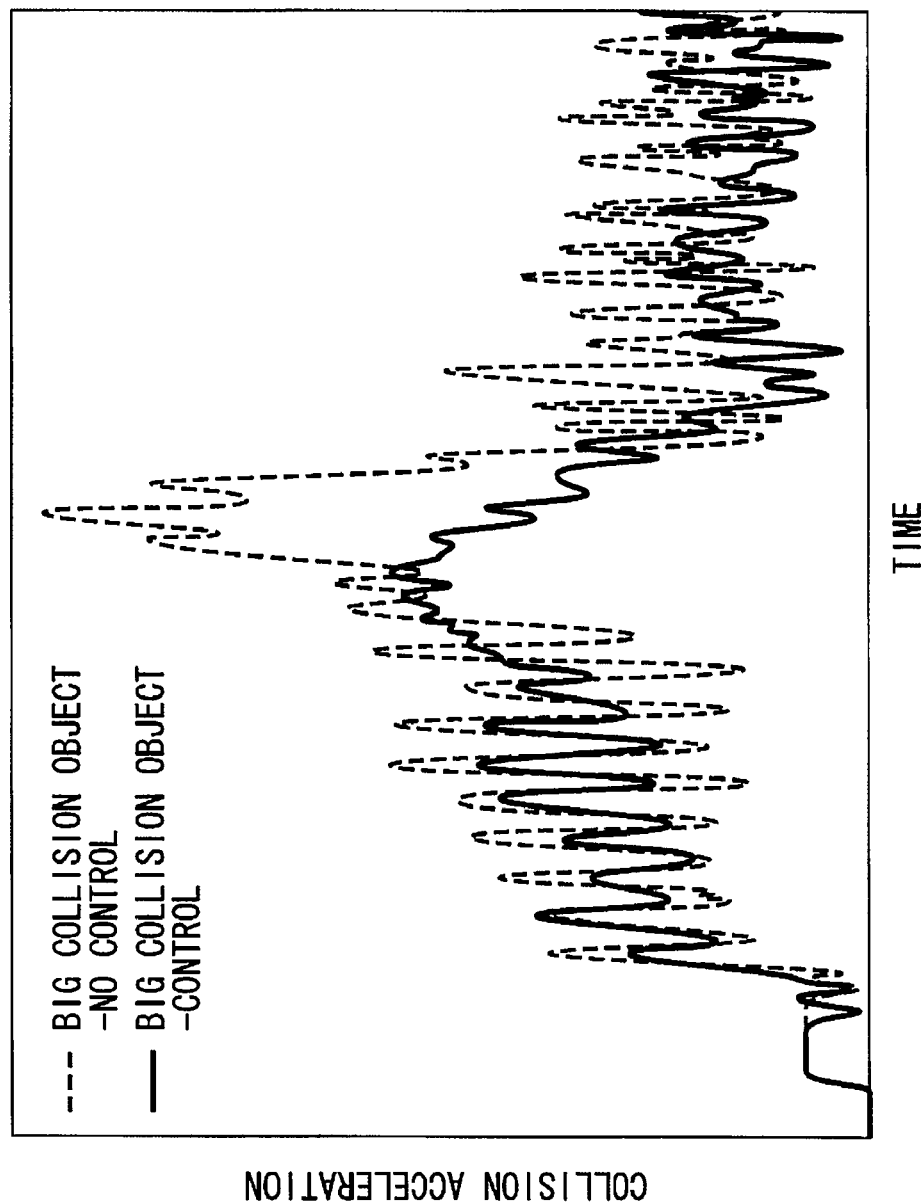
FIG. 16 It is a diagram showing a time change of a support load in the energy absorption process of the big collision object by the vehicle safety device according to the second embodiment of the invention.

Hereby, in the vehicle safety device 40, as shown in FIG. 16, compared with the case where the soft mode is not executed (refer to a dashed line in the same figure), the collision load (peak load) acting on the collision object P can be made small greatly. Further, FIG. 16 shows a numeral value calculation example of acceleration (load) acting on the collision object P in the collision time if the collision object P is big, in which object of comparison is, as shown in FIGS. 23A to 23E, and FIGS. 24A and 24B, acceleration acting on the collision object P if the collision object receiving portion 44 is always kept in the storage state in the automobile 11 having the vehicle safety device 40.

Figure 17A:
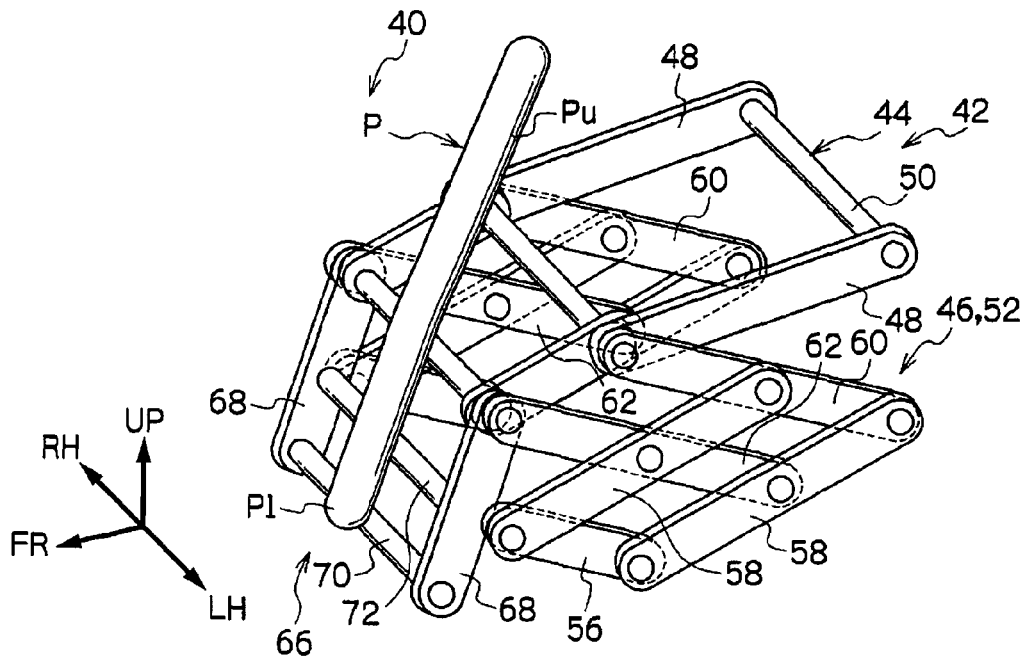
FIG. 17A It is a perspective view of a collision preparing state, showing an energy absorption process of a small collision object by the vehicle safety device according to the second embodiment of the invention.
Figure 17B:
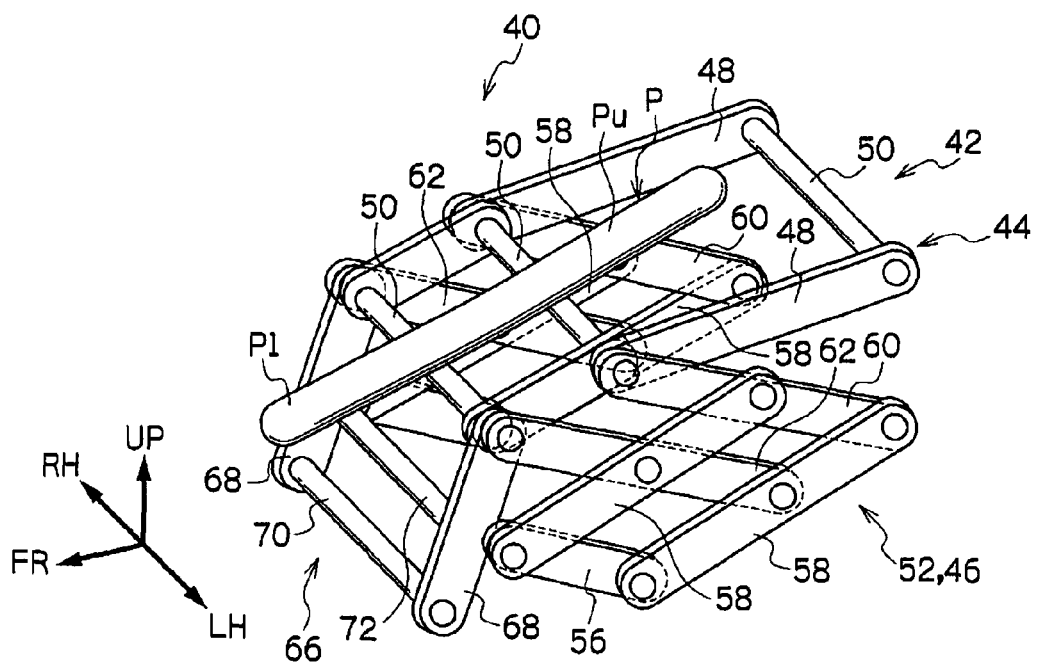
FIG. 17B It is a perspective view during execution of the soft mode, showing the energy absorption process of the small collision object by the vehicle safety device according to the second embodiment of the invention.

Next, the different point between the soft mode for the small collision object and the soft mode for the big collision object will be described. Regarding the unfolded state in the soft mode for the small collision object shown in FIG. 17A, compared with the unfolded state in the soft mode for the big collision object shown in FIG. 15A, the moving amount to the storage state, that is, the impact absorption stroke is set small (refer to also FIG. 13). Also in the soft mode for the small collision object, the ECU 64, after the upper portion Pu of the collision object P has collided with the collision object receiving portion 44, rotates the actuator 54 reversely, and moves the collision object receiving portion 44 to the storage state side, as shown in FIG. 17B.

Accordingly, if the collision object P is small, that is, assuming that the collision speed is the same and also if the collision energy is small compared with the case of the collision of the big collision object, the increase in the collision load (reaction force) with the movement of the collision object P and the collision object receiving portion 44 to the storage state side is suppressed during the impact energy absorption, so that the impact energy can be absorbed at the substantially constant load similarly to the case shown in FIG. 3. By the control shown by the dashed line in FIG. 13, if the collision speed is the same, the load acting on the small collision object is suppressed more than the load acting on the big collision object, so that the small collision object is caught more softly.

Figure 18:
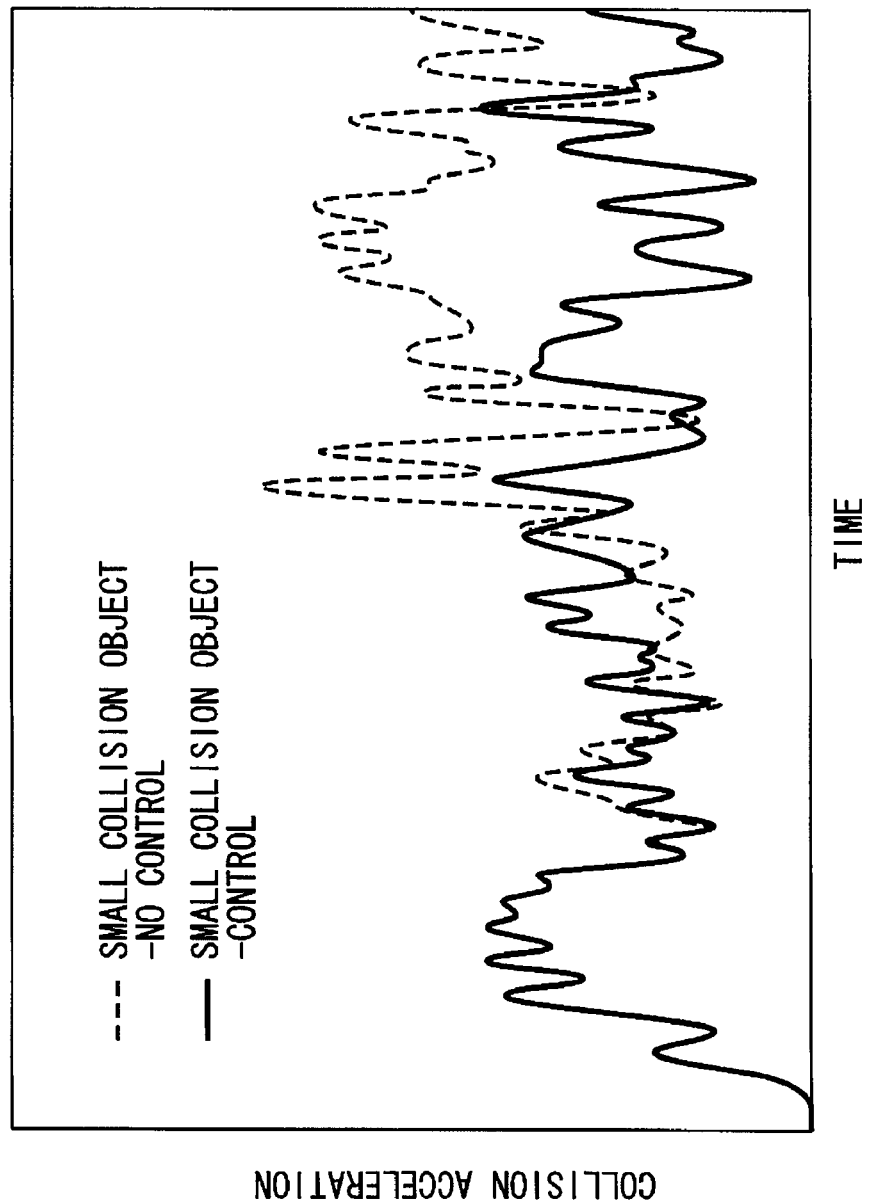
FIG. 18 It is a diagram showing a time change of a support load in the energy absorption process of the small collision object by the vehicle safety device according to the second embodiment of the invention.
Figure 25A:
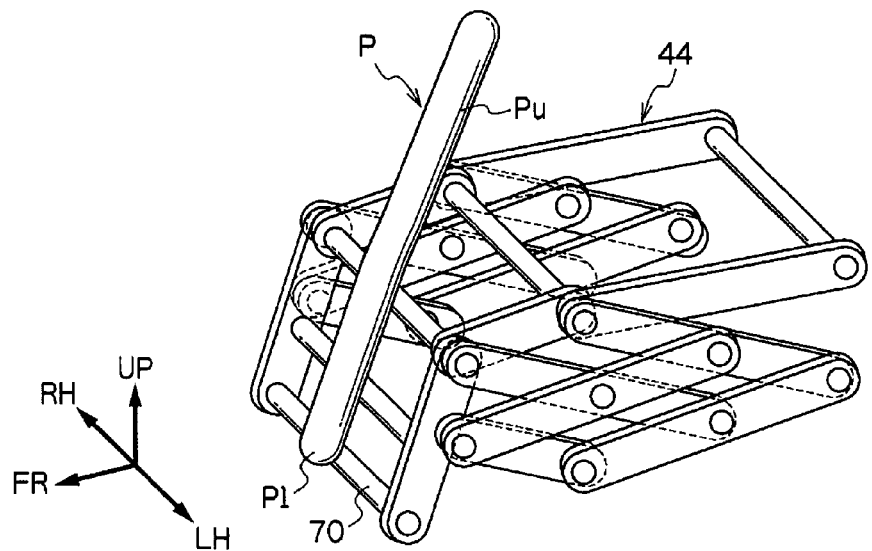
FIG. 25A, FIG. 25B They are perspective views showing energy absorption process of a small collision object in case that control for energy absorption is not performed, which corresponds to FIG. 17.
Figure 25B:
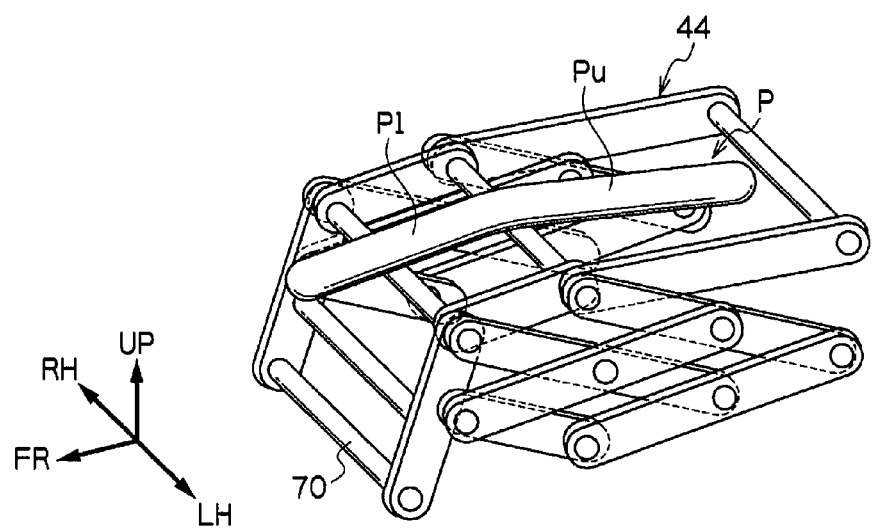

In the vehicle safety device 40, as shown in FIG. 18, compared with the case that the soft mode is not executed (refer to a dashed line in FIG. 18), the load acting on the small collision object can be suppressed more greatly. Further, FIG. 18 shows a numeral value calculation example of acceleration (load) acting on the collision object P in the collision time if the collision object P is small, in which object of comparison is, as shown in FIGS. 25A and 25B, acceleration acting on the collision object P if the collision object receiving portion 44 is always located in the storage state in the automobile 11 having the vehicle safety device 40.

As described above, in the vehicle safety device 40 according to the second embodiment, by driving the impact absorption structure 42 by device of the drive mechanism 46, the displacement area which suppresses the increase in load onto the collision object accompanied by the increase in displacement can be produced (the soft mode can be executed). Specifically, in the vehicle safety device 40, by moving the collision object receiving portion 44 to the unfolded state before the collision, the collision absorption stroke can be created; and by moving the collision object receiving portion 44 with which the collision object has collided to the storage state side by the drive force of the drive mechanism 46 (actuator 54), the soft mode can be realized.

Further, in the vehicle safety device 40, since the ECU 64 predicts the collision speed and the size of the collision object P, selects a soft mode on the basis of the prediction results, and executes the selected soft mode; the impact energy can be appropriately absorbed according to various impact patterns. Namely, in the vehicle safety device 40, the effective absorption of the impact energy is not performed in accordance with a previously assumed impact pattern, but rather, the appropriate absorption of the impact energy is performed depending on the actual impact pattern, and thereby the collision object P can be protected in various collision patterns. Further, hereby, the automobile 11 can be also protected from the collision of the collision object P.

Further, since the vehicle safety device 40 includes the bounce-up mechanism 66, the collision object P is surely led onto the collision object receiving portion 44 of the impact absorption structure 42, so that the impact energy can be satisfactorily absorbed as described above (the collision object P can be protected). Further, in the vehicle safety device 40, since the bounce-up mechanism 66 can lead the collision object P to the center portion in the vehicle width direction of the collision object receiving portion 44 regardless of the collision position of the collision object P in the vehicle width direction of the bounce-up bar 70, the appropriate absorption of the impact energy can be performed regardless of the collision position of the collision object P. Further, the bounce-up mechanism 66, since the pair of left and right swing arms provided on the both end sides of the bounce-up bar 70 can be independently driven, can lead the collision object P which collides with the offset position from the center portion in the vehicle width direction of the bounce-up bar 70 to the center portion in the vehicle width direction of the collision object receiving portion 44 by simple structure. Further, in place of the bounce-up portion 28, this bounce-up mechanism 66 may be applied to the vehicle safety device 10.

Furthermore, in the vehicle safety device 40, if the collision object P cannot be led to the center portion in the vehicle width direction of the collision object receiving portion 44 by the bounce-up mechanism 66, the collision object P is led (ejected) by the bounce-up mechanism 66 to the outside in the vehicle width direction of the automobile 11. Therefore, it is prevented that the collision object P collides with the portions other than the collision object receiving portion 44.

Third Embodiment

Figure 19:
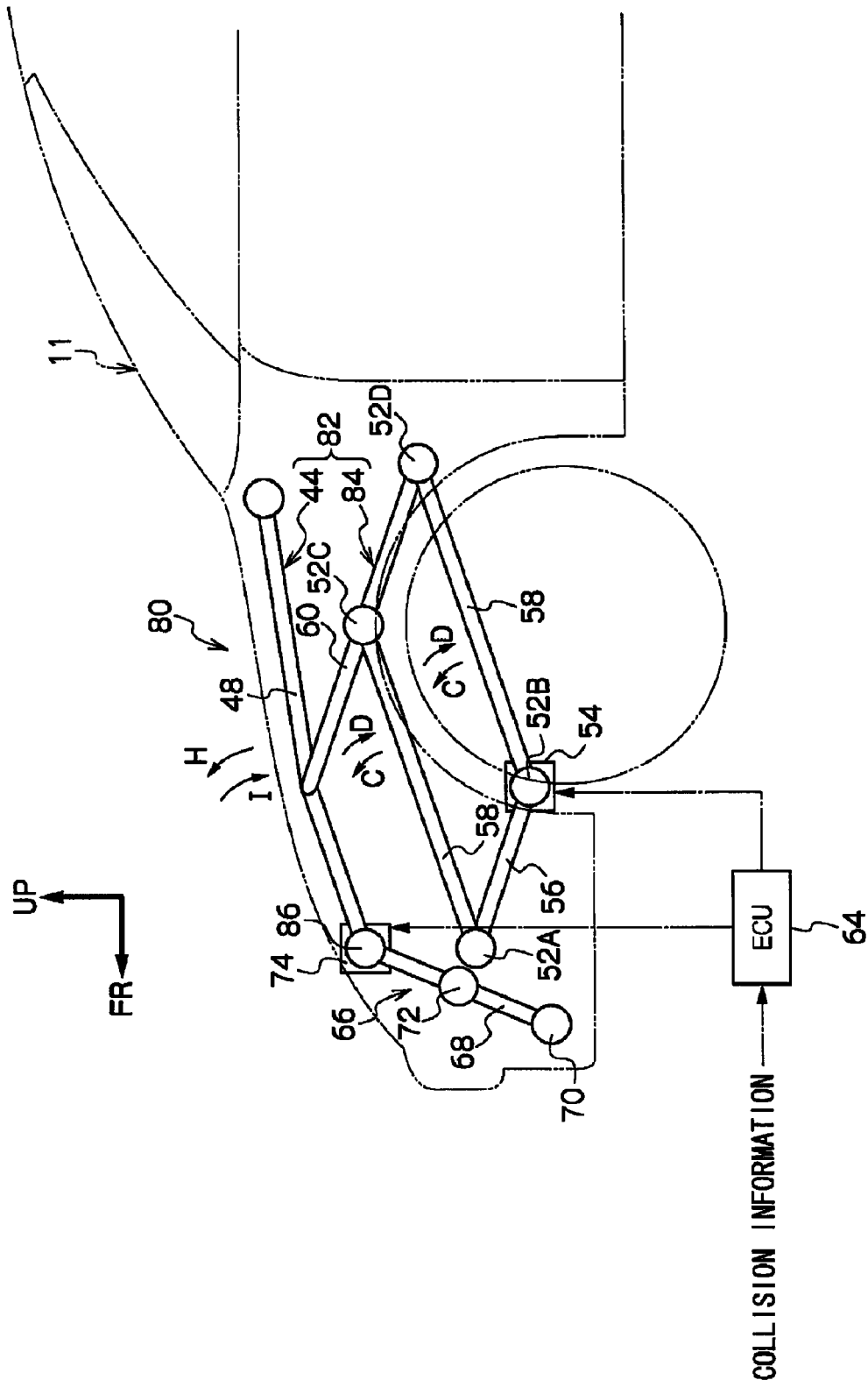
FIG. 19 It is a side view showing schematically a vehicle safety device according to a third embodiment of the invention.

FIG. 19 is a schematic side view showing a vehicle safety device 80 according to a third embodiment of the invention. As shown in this figure, the vehicle safety device 80 is different from the vehicle safety device 40 according to the second embodiment in that an impact absorption structure 82 as an impact absorption unit includes a drive mechanism 84 as a drive unit in place of the drive mechanism 46.

Figure 20:
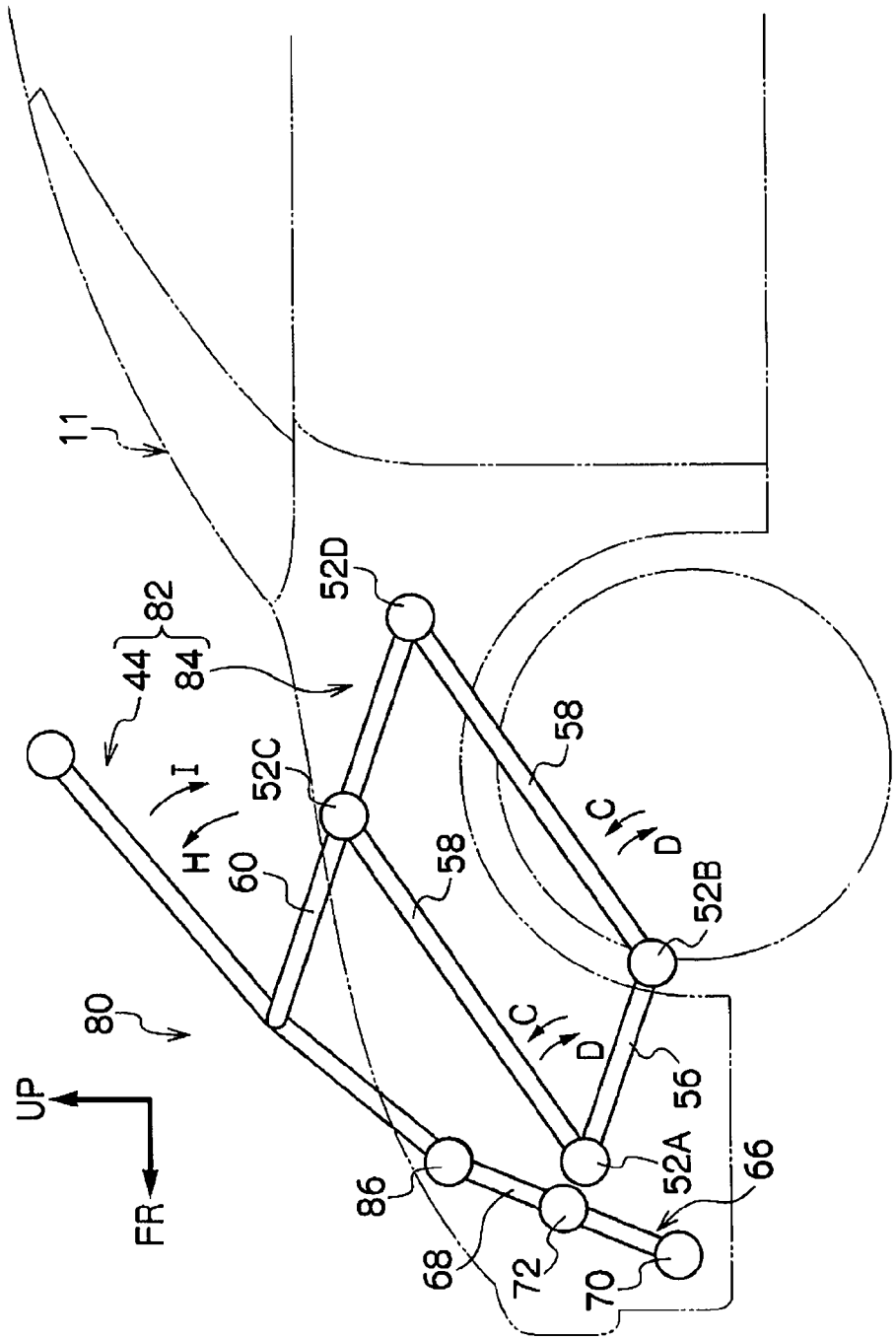
FIG. 20 It is a side view showing schematically an unfolded state of the vehicle safety device according to the third embodiment of the invention.

In the impact absorption structure 82, a collision object receiving portion 44 is pivotally supported around a rotational shaft 86 located along the vehicle width direction at the front end portion (near the installation position of a most front collision object receiving member 50). Therefore, regarding the collision object receiving portion 44, its storage state coincides with the storage state in the vehicle safety device 40, and its unfolded state is, as shown in FIG. 20, a position where the collision object receiving portion 44 rotates around the rotational shaft 86 in the direction of an arrow H. The drive mechanism 84 of this impact absorption structure 82 does not have a lower output link 62, and a leading end of an upper output link 60 engages with a corresponding side frame 48 slidably in the longitudinal direction (although illustration thereof is omitted, for example, a pin provided for the upper output link 60 is fitted into a long hole of the side frame 48).

Hereby, in the drive mechanism 84, when an actuator 54 rotates normally, an intermediate link 58 rotates in the direction of an arrow C and the collision object receiving portion 44 is moved to the unfolded position. When the actuator 54 rotates reversely from the unfolded position, the intermediate link 58 rotates in the direction of an arrow D, and the collision object receiving portion 44 moves to the storage position side (the direction of an arrow I) (a soft mode is executed). Other configuration of the vehicle safety device 80 is the same as the corresponding configuration of the vehicle safety device 40.

Accordingly, also in the vehicle safety device 80 according to the third embodiment, by the similar operation to the operation of the vehicle safety device 40 according to the second embodiment, the similar effect can be obtained.

Fourth Embodiment

Figure 21:
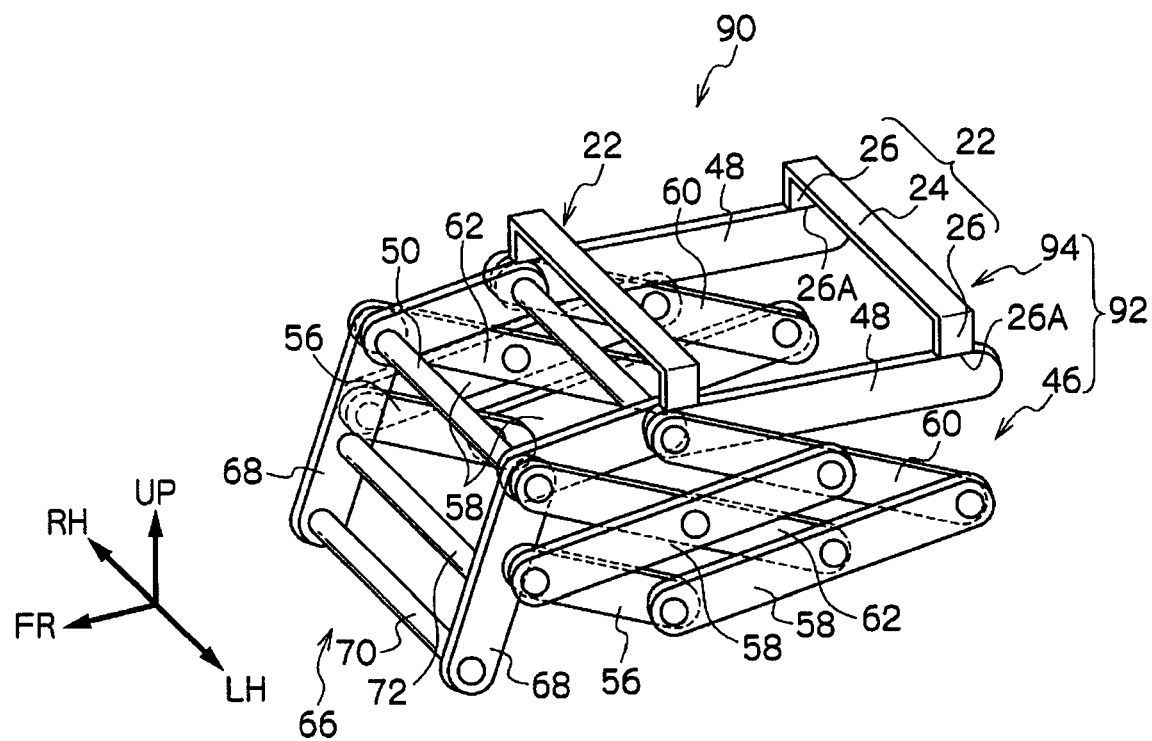
FIG. 21 It is a perspective view showing a storage state of a vehicle safety device according to a fourth embodiment of the invention.
Figure 22:
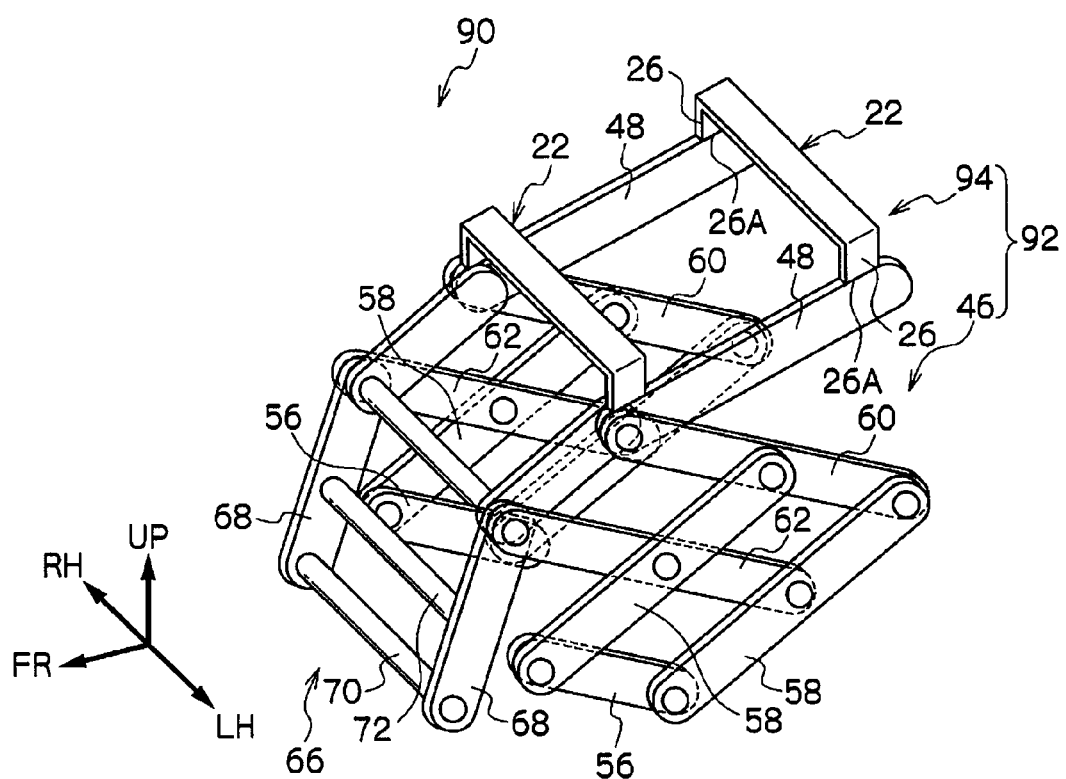
FIG. 22 It is a perspective view showing an unfolded state of the vehicle safety device according to the fourth embodiment of the invention.
Figure 23A:
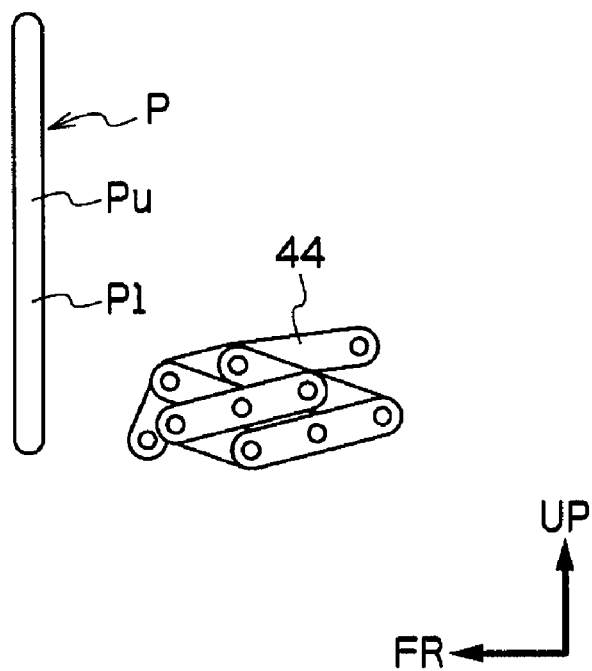
FIG. 23A, FIG. 23B, FIG. 23C, FIG. 23D, FIG. 23E They are side views showing energy absorption process of a collision object in case that control for energy absorption is not performed, which corresponds to FIG. 14.
Figure 23B:
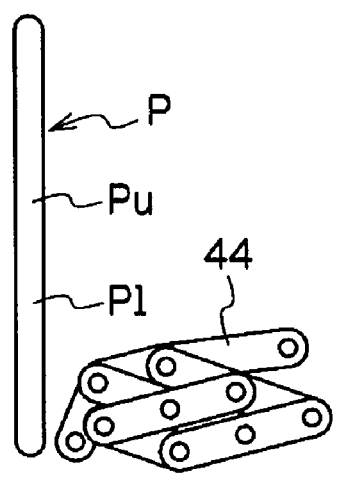
Figure 23C:
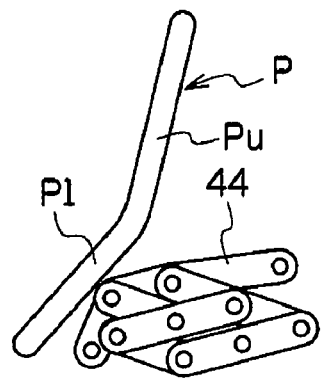
Figure 23D:
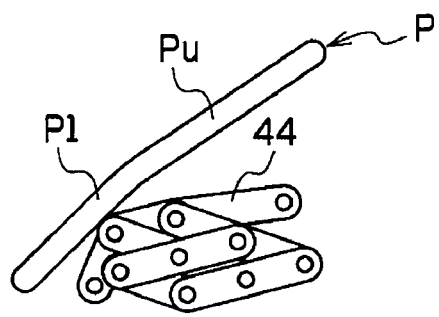
Figure 23E:
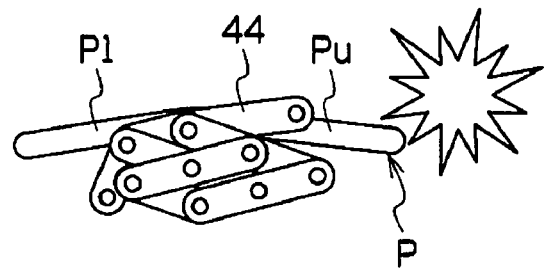
Figure 24A:
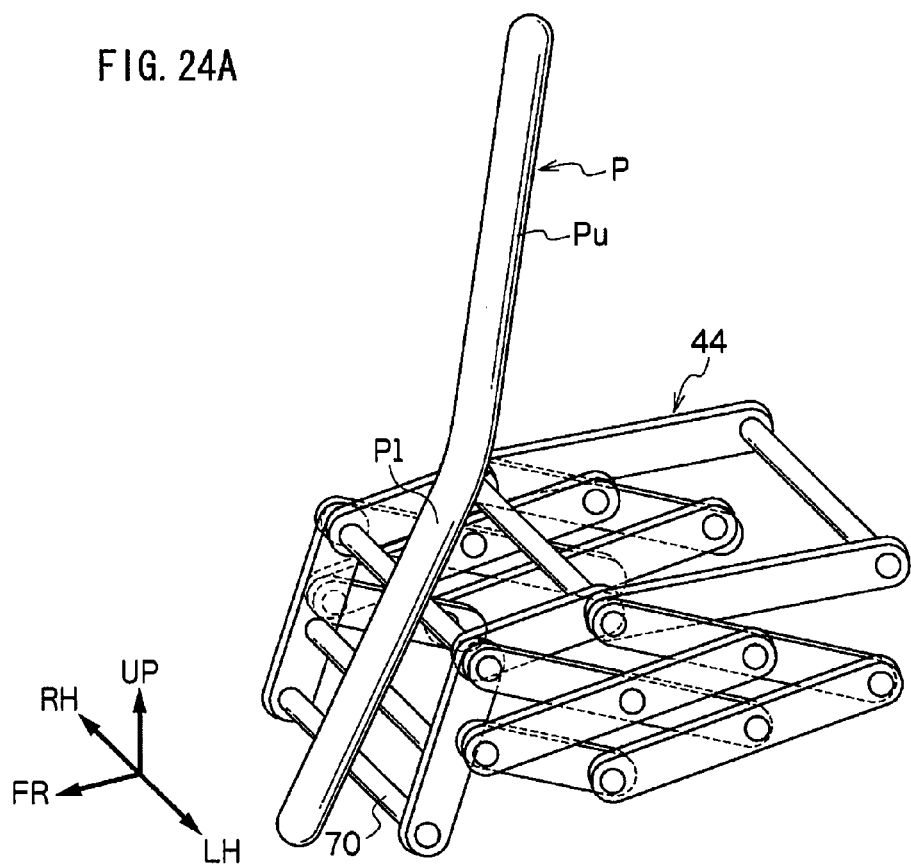
FIG. 24A, FIG. 24B They are perspective views showing energy absorption process of a big collision object in case that control for energy absorption is not performed, which corresponds to FIG. 15.
Figure 24B:
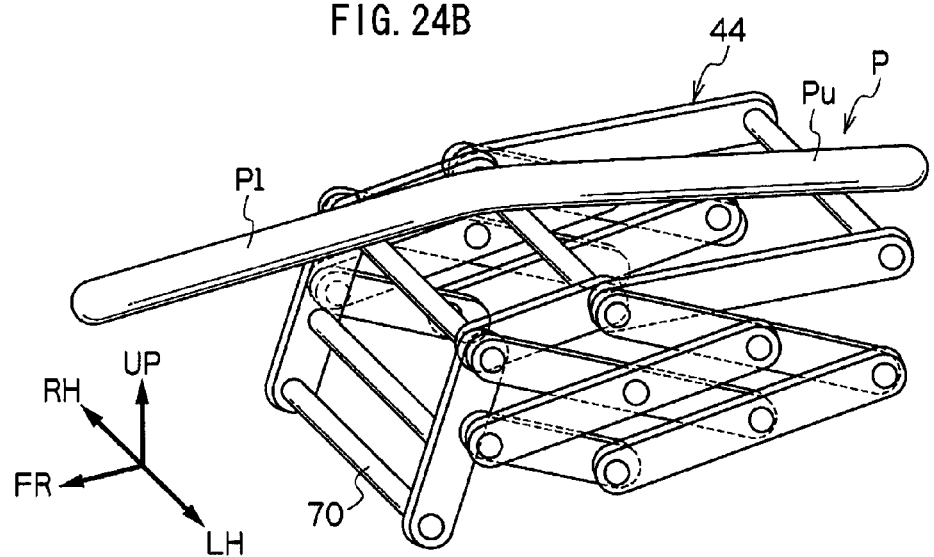

FIG. 21 is a schematic perspective view showing a storage state of a vehicle safety device 90 according to a fourth embodiment of the invention, and FIG. 22 is a schematic perspective view showing a unfolded state of the vehicle safety device 90. As shown in these figures, the vehicle safety device 90 is different from the vehicle safety device 40 according to the second embodiment in that an impact absorption structure 92 as an impact absorption unit configuring the vehicle safety device 90 includes, in place of the collision object receiving portion 44 in which the collision object receiving members 50 are bridging between the pair of left and right side frames 48, a collision object receiving portion 94 as a load input portion in which impact absorption members 22 are bridging between side frames 48.

The collision object receiving portion 94 is configured by fixing an end portion 26A on the opposite side to the collision object receiving body 24 side of a pair of legs 26 configuring the impact absorption member 22 to the upper surface side of the corresponding side frame 48. Other configuration of the vehicle safety device 90 is the same as the corresponding configuration of the vehicle safety device 40. Accordingly, also in the vehicle safety device 90 according to the fourth embodiment, by the similar operation to the operation of the vehicle safety device 40 according to the second embodiment, the similar effect can be obtained.

Further, in the vehicle safety device 90, since the impact absorption member 22 configuring the impact absorption structure 92 can itself produce a displacement area (soft area) which suppresses an increase in supporting load accompanied by an increase in displacement of a collision object P, a favorable soft mode can be realized in a smaller operation stroke of the collision object receiving portion 94. For example, if the amount of increase in the supporting load due to the impact absorption member 22 becomes equal to or greater than a predetermined value, driving of the collision object receiving portion 94 to the storage position side by the drive mechanism 46 may be initiated.

Fifth Embodiment

A vehicle safety device 100 according to a fifth embodiment of the invention will be described with reference to FIGS. 26 and 27.

Figure 26:
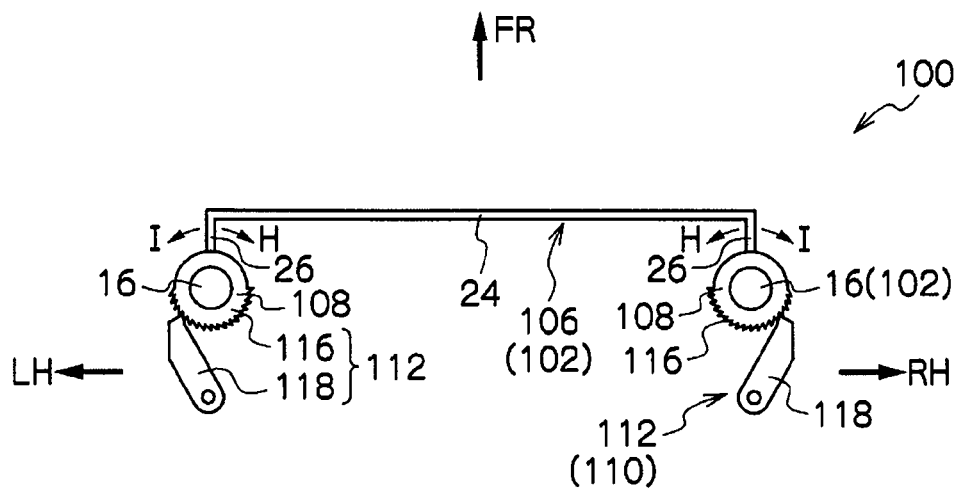
FIG. 26 It is a plan view showing a state before impact absorption of a vehicle safety device according to a fifth embodiment of the invention.

FIG. 26 is a schematic plan view showing a vehicle safety device 100 (in a collision preparing state described later) which is applied to an automobile 11. As shown in this figure, the vehicle safety device 100 includes a collision absorption structural body 102 as an impact absorption portion which is provided at the vehicle body front portion of the automobile 11, and faces forward and upward (takes a backward slanting state with respect to a perpendicular surface). The impact absorption structural body 102 is supported in the above backward slanting state by front side members 14 forming a frame of the vehicle body front portion of the automobile 11. The vehicle safety device 100 will be concretely described below.

The impact absorption structural body 102 has a pair of left and right side frames 16 as a support portion which is long in the vehicle body front-rear direction. In this embodiment, the pair of left and right side frames 16 is formed of a high-rigid member having a closed-section structure, such as a pipe material. Further, in this embodiment, each side frame 16 has a circular sectional shape (peripheral surface is cylindrical surface). The pair of left and right side frames 16 are arranged on the upper side of their corresponding front side members 14, a front end portion 16A of each side frame 16 is supported pivotably around a pivot 19 along the vehicle width direction through a bracket 18 at the front end portion of the front side member 14, and an intermediate portion 16B in the longitudinal direction of each side frame 16 is supported by the front side member 14 through an actuator 20 as an impact absorption portion driving unit.

In this support state, the pair of left and right side frames 16, so that each front end portion 16A is located in the lower position than the intermediate portion 16B in the longitudinal direction, that is, than a back end portion 16C, slants with respect to a horizontal surface (the vehicle body front-rear direction). An impact absorption member 106 as an elastic member which is long in the vehicle width direction is laid between the left and right side frames 16. In this embodiment, the plural (four in this embodiment) impact absorption members 106 spaced in parallel in the longitudinal direction of each side frame 16 are bridging between the left and right side frames 16.

Each of the impact absorption member 106 includes a collision object receiving portion 24 as a load input portion which is long in the vehicle width direction, and a pair of legs 26 (corresponding to ends in the longitudinal direction of the load input portion in the invention) which are hung down from both ends in the longitudinal direction of the collision object receiving portion 24. In this embodiment, the collision object receiving portion 24 is formed in the shape of a plate along a parallel direction of the plural impact absorption members 106, and the pair of legs 26 continue to the collision object receiving portion 24 with the same width as if they were fold at a substantially right angle with the collision object receiving portion 24. Accordingly, the impact absorption member 106 is formed in the substantially U-shape opening downward seen from the end in its width direction.

In each of the impact absorption members 106 in this embodiment, to an end on the opposite side to the collision object receiving portion 24 side of each leg 26, a support portion 108 is fixed. Each support portion 108 is formed in the substantially cylindrical shape, and supported by the corresponding side frame 16 pivotably (so that angular displacement can be made) around a self-axis. Further, regarding each support portion 108, the relative displacement in the axial direction with respect to the side frame 16 is prohibited by a not-shown stopper.

Therefore, the collision object receiving portion 24 of the impact absorption member 106 is located above the left and right side frames 16. In the impact absorption member 106 forming the substantially U-shape as described above, the pair of legs 26 are supported to the side frame 16 through each support portion 108 so that the relative displacement (contact and separation) in the vehicle width direction of each support portion 108 is regulated and only the angular displacement around the axis of the side frame 16 is permitted. Therefore, the impact absorption member 106, if a forced displacement (deflection deformation) toward the vehicle body side is applied to the center portion in the vehicle width direction of the collision object receiving portion 24, obtains a displacement-load characteristic shown by a solid line or an imaginary line in FIG. 3.

Namely, each impact absorption member 106 has the configuration in which there is produced a displacement area B (soft region) where an increase in load is suppressed, accompanied by an increase in displacement (deflection) in the vehicle body direction (the plate thickness direction) of each impact receiving portion 24. The ranges of load and displacement in this displacement area B can be appropriately set according to quality of material configuring the impact absorption member 106, and a dimensional shape of the impact absorption member 106 (the collision receiving portion 24 and the pair of legs 26). Further, the displacement-load characteristic of each impact absorption member 106 may be made different according to the installed position of the member 106.

The left and right actuators 20 are configured so as to be capable of expanding and contracting in their longitudinal directions by device of hydraulic pressure, air pressure, or electric power. An upper end 20A of the actuator 20 is supported by the side frame 16 pivotably around a pivot 104 located along the vehicle width direction, and a lower end 20B thereof is supported by the front side member 14 pivotably around a pivot 27 located along the vehicle width direction. Each actuator 20 takes usually a contracted state, and extends by actuation. By extension of these actuators, the impact absorption structural body 102 rotates around the pivot 19 so as to separate from the vehicle body, and the state of the impact absorption structural body 102 changes from a storage state to a collision preparing state.

The collision preparing state is a state in which the collision absorption structural body 102 rotates around the pivot 19 by an angle θ with the storage state, and the angle θ in this embodiment is set in a range θ of about 50° to 80° similarly to that in the first embodiment. As shown in FIG. 4B, when the angle is in the range of about 50° to 80°, an average acceleration (value of integral) of the collision object is reduced, from which it is known that this angle range contributes to good energy absorption. It has been ascertained that the effective (optimum) range of this angle θ does not depend on the collision speed of the collision object with the impact absorption structural body 102, but is substantially contact.

The above-described impact absorption structural body 102 may be arranged, for example, below (inside) an engine hood having the soft structure, and at least the portion except the both ends in the vehicle width direction of the collision object receiving portion 24 may be arranged, exposed on the engine hood. Further, a group of the collision object receiving portions 24 (impact absorption members 106) itself may be covered with a coated layer to form the engine hood. In this embodiment, the four impact absorption members 106 are arranged so as to equalize substantially the engine hood in plain view.

Further, the vehicle safety device 100 includes a bounce-up portion 28 as a guide unit. The bounce-up portion 28 is configured by bridging a bounce-up bar 30 between lower portions 18A of the left and right brackets 18 which are extended to the downside of the front side member 14. The bounce-up bar 30 is spaced apart from the road surface by the predetermined height at the front lower end portion of the automobile 11, and configured as a part in the automobile 11 which comes into first contact with a collision object on the road surface (as a part which receives firstly the load substantially). Accordingly, if a lower portion Pl of a collision object P which is long in the up-down direction has collided with the bounce-up bar 30 as shown in FIG. 27, the low portion Pl of the collision object P is bounced up (scooped up), so that the collision object P is led so as to fling itself on the collision absorption structural body 102.

Further, the vehicle safety device 100 includes a collision object retaining mechanism 110 for retaining the collision object P received by the impact absorption structure 102. The collision object retaining mechanism 110 includes as a main component thereof a rebound preventing mechanism 112 as a reversion suppressing device for preventing rebound of the collision object P that accompanies reversion of the impact absorption members 106 configuring the impact absorption structural body 102 after absorption of the collision energy by the impact absorption structural body 102. The rebound preventing mechanism 112 will be described in more detail below.

Figure 27:
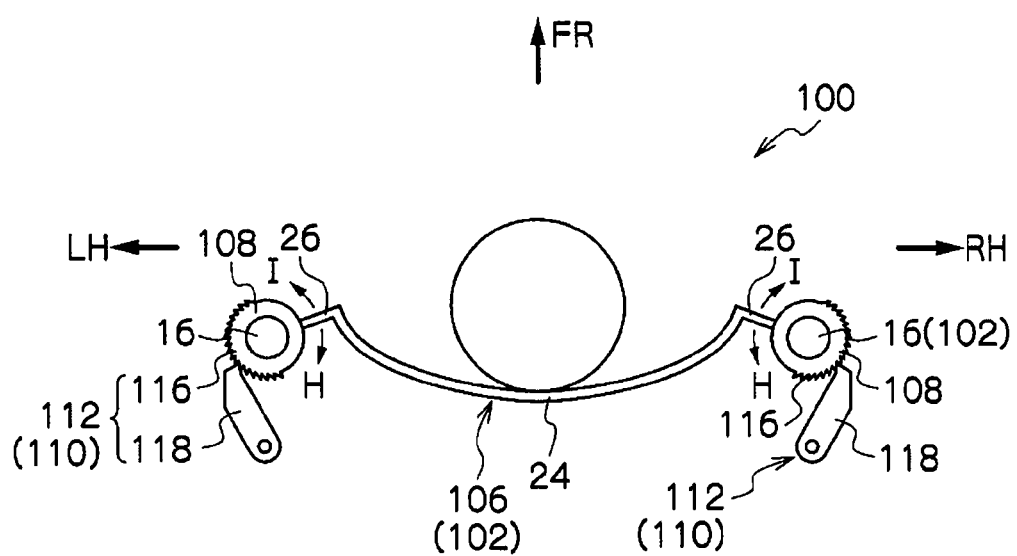
FIG. 27 It is a plan view showing a state after impact absorption of the vehicle safety device according to the fifth embodiment of the invention.

As shown in FIGS. 26 and 27, the bounce-back preventing mechanism 112 is a ratchet mechanism including ratchet teeth (ratchet wheel) 116 formed on each support portion 108 of the impact absorption member 106, and a ratchet 118 which meshes together with the ratchet teeth 116. This bounce-back preventing mechanism 112, as shown in FIG. 27, permits the pair of legs 26 to make angular displacement in a direction where the respective legs falls inward of the vehicle width direction (in the direction of an arrow H), while prohibits the pair of legs 26 from making the angular displacement in the opposite direction (the direction of an arrow I) to the direction of the arrow H.

Hereby, the rebound preventing mechanism 112 is configured as shown in FIG. 27, such that the impact absorption member 106, in which the collision object receiving portion 24 receives deflection deformation through collision with the collision object P, while causing the pair of legs 26 to fall in the direction of the arrow H, is prevented from reverting from the deformed state thereof (i.e. from returning to the state shown in FIG. 26). Namely, in the vehicle safety device 100, after the absorption of collision energy of the collision object P by the impact absorption structural body 102, the impact absorption member 106 is retained in the state shown in FIG. 27. Hereby, in the vehicle safety device 100, separation of the collision object P from the impact absorption structural body 102 accompanied by the reversion of the impact absorption member 106 is prevented. Accordingly, in this embodiment, the ratchet teeth 116 and the ratchet 118 configuring the bounce-back preventing mechanism 112 as the reversion restraining device correspond to the ratchet mechanism in the invention.

Further, the vehicle safety device 100 includes an ECU 32 as a controller. The ECU 32 in this embodiment is electrically connected to each actuator 20. Further, to the ECU 32, signals from vehicle sensors such as a millimeter-wave radar (distance sensor), a vehicle speed sensor, and a CCD camera (imaging device) are input directly or through another ECU.

On the basis of these information, the ECU 32 predicts collision of a collision object P. Since a method of such the prediction can use known methods, its description is omitted. The ECU 32, if it has predicted the collision of the collision object P, actuates each actuator 20. Accordingly, in the vehicle safety device 100, if ECU 32 has predicted the collision, the state of the impact absorption structural body 102 changes from the storage state from the collision preparing state.

As described above, the vehicle safety device 100 is different from the vehicle safety device 10 in that: the impact absorption structural body 102 provided in place of the impact absorption structural body 12 includes the impact absorption member 106 of which the pair of legs 26 can supported through the support portions 108 by the side frames 16 so as to be capable of making the angular displacement, in place of the impact absorption member 22 of which the pair of legs 26 are fixed to the side frames 16; and the bounce-back preventing mechanism 112 which regulates the displacement in the direction of the arrow I of the angular displacements.

Next, the operation of the fifth embodiment will be described.

In the automobile 11 to which the vehicle safety device 100 having the above configuration is applied, the ECU 32, if the ECU 32 has predicted that the collision object P collides with the front surface of the automobile 11 (has determined that probability of collision is equal to or larger than a threshold), actuates each actuator 20. Then, the actuators 20 expand respectively by the predetermined amount, and the state of the impact absorption structural body 102 changes to the collision preparing state by this expansion (similarly to the case shown in FIG. 5A).

In this automobile 11, when the collision object P collides with the front surface side of the automobile 11, firstly, the bounce-up bar 30 of the bounce-up portion 28 comes into contact with a lower portion Pl of a collision object P, and the collision object P is led onto the impact absorption structural body 102 (with a back-downward component of velocity) so that the lower portion Pl is scooped. Then, the collision object P comes into contact with the collision object receiving portion 24 of each impact absorption member 106 configuring the impact absorption structural body 102. The impact absorption member 106, so that the collision object receiving body 24 is pressed mainly by a upper portion Pu of the collision object P, is deflected to the downside (vehicle body side) in the thickness direction while supporting a collision load. Hereby, the impact energy in which the support load is integrated by displacement is absorbed by the impact absorption structural body 102.

In the vehicle safety device 100, the collision energy of the collision object P is absorbed by the deformation of each impact absorption member 106; and when the deformation of the impact absorption member 106 is stopped, the ratchet 118 meshes with the ratchet teeth 116 to prohibit each support portion 108 from rotating in the direction of the arrow I. Accordingly, the impact absorption member 106, as shown in FIG. 27 is retained in the deformation state (state) in completion of the collision energy absorption of the collision object P. Therefore, the bounce-back preventing mechanism 112 prevents bounce-back of the collision object P accompanied by the reversion of the impact absorption member 106.

As described above, in the vehicle safety device 100, by the deformation of the impact absorption member 106 of the impact absorption structural body 102, the collision energy of the collision object P is absorbed. In particular, since the impact absorption structural body 102 shifts from the storage state to the collision preparing state and receives the collision object P, an impact absorption (deformation) stroke of the impact receiving portion 24 can be secured enough, so that the collision load (peak collision load) acting on the collision object P can be alleviated. Further, since the impact absorption member 106 configuring the impact absorption structural body 102 represents a displacement-load characteristic shown by a solid line in FIG. 3, the collision load acting on the collision object P can be alleviated more.

Further, in the vehicle safety device 100, since the deformation of the impact absorption member 106 accompanied by the absorption of this collision energy is retained by the bounce-back preventing mechanism 112 also after the absorption of the collision energy, it is prevented that the collision object P falls down from the collision absorption structural body 102 with the reversion of the impact absorption member 106.

Further, in the vehicle safety device 100, the bounce-back preventing mechanism 112 fulfilling the above function with the simple structure is composed mainly of the ratchet teeth 116 and the ratchet 118 provided for each support portion 108.

In the above embodiments, although parts of the embodiments of the invention are exemplified as described above, the invention is not limited to this, but it will be obvious that various modification of the invention can be carried out. Accordingly, for example, if the impact absorption structural body 102 according to the fifth embodiment (the impact absorption member 106, the supporting portion 108, and the bounce-back preventing mechanism 112) may be applied, in place of the impact absorption member 22, to the vehicle safety device 90 according to the fourth embodiment.

Further, in the above embodiments, although the example in which the vehicle safety devices 10, 40, 80, 90 and 100 are applied to the vehicle body front portion is shown, the invention is not limited to this, but the vehicle safety device of the invention can be applied in each position of the vehicle body.

Further, in the above second to fourth embodiments, although the example in which the soft mode is realized by the feedforward control is shown, the invention is not limited to this. For example, the soft mode can be realized by various controls, such as a control in which the supporting load due to the collision object receiving portion 44 is detected and feedback control is performed, or in which this manner of feedback control is added to the above feedforward control.

Further, in the above second to fourth embodiments, although the example in which the collision object receiving portions 44 and 94 are driven by the drive mechanism 46 and 84 including the quadric crank chain is shown, the invention is not limited to this, for example, but the collision object receiving portion 44 may be rotation-driven around the rotational shaft 86 by an actuator such as a motor. Further, in the vehicle safety devices 40, 80 an 90, since the quadric crank chain having the two upper-lower output links 60 and 62, or the quadric crank chain having the upper output link 60 which presses the position apart from the rotational shaft 86 is used, compared with the configuration in which the collision object receiving portion 44 is rotation-driven around the rotational shaft 86 by the actuator such as the motor, the support rigidity of the collision object P is readily obtained.

Similarly, in the first and fifth embodiments, although the example in which the impact absorption structural body 12 is driven by the two left-right actuators which expand and contract by the electric power is shown, the invention is not limited to this, but it will be obvious that various actuators and mechanism (combination of them) can be used.

Further, in the second to fourth embodiments, although the example in which the collision object receiving member 50 or the collision absorption member 22 constitutes the contact portion with the collision object is shown P, the invention is not limited to this. For example, a plate-like load input portion such as an engine hood may be driven by the drive mechanism 46.

Furthermore, in the above each embodiment, although the example in which the bounce-up portion 28 or the bounce-up mechanism 66 is provided is shown, the invention is not limited to this. For example, the configuration without this portion or mechanism may be adopted, or the vehicle safety device may be provided with the bounce-up portion 28 or the bounce-up mechanism 66 having another structure.

Further, in the above each embodiment, although the example in which the displacement-load characteristic shown by the solid line in FIG. 3, that is, the soft region in which the increase in support load accompanied by the increase in displacement is suppressed is realized is shown, the invention is not limited to this. For example, as shown by a two-dot chain lines in FIG. 3, the soft region may be realized by such as displacement-load characteristic that the increase in load is reduced, accompanied by the increase in displacement.

Further, in the above each embodiment, although the example in which the collision object structural body 102 shifts to the collision preparing state before the collision of the collision object P is shown, the invention is not limited to this. For example, for the collision absorption structural body (one or plural impact absorption members 106) fixed to the vehicle body, the bounce-back preventing mechanism 112 may be provided.

Further, in the above each embodiment, although the example in which the impact absorption member 106 has the pair of legs 26 is shown, the invention is not limited to this, but the both ends in the longitudinal direction of the collision object receiving portion 24 may be fixed to each support portion 108.

Furthermore, in the above each embodiment, although the example in which the bounce-back preventing mechanism is configured by including the ratchet mechanism as the reversion restraining device is shown, the invention is not limited to this. For example, the bounce-back preventing mechanism may be configured by including, as the reversion restraining device, a one-way clutch which permits rotation of the support portion 108 in the direction of the arrow H and prohibits the rotation thereof in the direction of the arrow I, or a brake unit (electromagnetic brake) which operates thereby to prohibit rotation of the support portion 108 with respect to the side frame 16, 68.

The invention claimed is:

1. A vehicle safety device provided with an impact absorption unit, the impact absorption unit comprising:
   an impact absorption body, the impact absorption body comprising:
      an elongated load input portion having a pair of ends,
      a pair of legs, each leg having ends, one leg of the pair of legs being coupled at one end to an end of the elongated load input portion and another leg of the pair of legs being coupled at one end to a different end in a longitudinal direction of the elongated load input portion, and
      a support portion to which other ends of each leg of the pair of legs are fixed such that contact and separation of the other ends of the pair of legs in the longitudinal direction of the load input portion are regulated and the ends of the pair of legs are displaced relative to the other ends of the pair of legs, as the load input portion folds;
   a drive unit which can drive the impact absorption body in a direction of separation from the vehicle body; and
   a controller which, if the controller has predicted a collision with a collision object, controls the drive unit so that the impact absorption body is driven by the predetermined amount in the direction of separation from the vehicle body,
   wherein the vehicle safety device is configured to generate a displacement area which suppresses an increase in a supported load with respect to an increase in folding displacement in a collision direction of the load input portion.

2. The vehicle safety device according to claim 1, wherein:
   the impact absorption body is supported so that one end side thereof can rotate with respect to the vehicle body; and
   the drive unit is controlled by the controller, and rotates the impact absorption body by an angle of 50° to 80° with respect to the vehicle body in a direction in which the other end side of the impact absorption body separates from the vehicle body.

3. The vehicle safety device according to claim 1, wherein the pair of legs is formed integrally with the load input portion, which is formed in the shape of a plate, by folding both ends in the longitudinal direction of the load input portion.

4. The vehicle safety device according to claim 3, wherein, in the impact absorption body, the pair of legs is formed on one side in the plate thickness direction of the load input portion, and the impact absorption body is supported by the drive unit in a state where the support portion is positioned further to a vehicle body side than the load input portion.

5. The vehicle safety device according to claim 1, wherein the impact absorption body is configured by providing plural load input portions in parallel in a direction which is orthogonal to the longitudinal direction of the load input portion and which is also orthogonal to the contact and separation direction with respect to the vehicle body.

6. The vehicle safety device according to claim 1, wherein the impact absorption unit is provided at a vehicle body front portion, thereby absorbing an impact energy of the collision object that collides with the vehicle body downward in a vertical direction of the vehicle.

7. The vehicle safety device according to claim 6, further comprising a guide unit which guides the collision object located on a road surface so that the collision object collides with the impact absorption unit.

8. The vehicle safety device according to claim 7, wherein
   the impact absorption unit extends in the vehicle width direction; and
   the guide unit is configured so as to guide the collision object to a center portion in the vehicle width direction of the impact absorption unit.

9. The vehicle safety device according to claim 8, wherein the guide unit comprises:
   a pair of advance and retreat members which can independently attain a protrusion position, which protrudes from the vehicle body in the vehicle body front-rear direction, and a retreat position which is at a rear side in the vehicle body front-rear direction with respect to the protrusion position;
   a guide member which bridges the pair of advance and retreat members;
   a guide driving unit which can impart a drive force in the vehicle front-rear direction to the pair of advance and retreat members, independently; and
   a guide controller which controls the drive unit according to the collision position or the predicted collision position of the collision object in the vehicle width direction of the guide member.

10. The vehicle safety device according to any one of claims 6 to 9, further comprising an expelling unit which if it is determined that the predicted collision position of the collision object or a guide position of the guide unit is offset outside a predetermined range of the impact absorption unit, expels the collision object toward the outside of the vehicle body in the vehicle width direction.

11. A vehicle safety device comprising:
   an impact absorption portion which is displaced from a vehicle body while supporting a collision load, thereby absorbing collision energy of a collision object, the impact absorption portion comprising:
      an elongated load input portion having a pair of ends,
      a pair of legs, each leg having ends, one leg of the pair of legs being coupled at one end to an end of the elongated load input portion and another leg of the pair of legs being coupled at one end to a different end in a longitudinal direction of the elongated load input portion, and a support portion to which other ends of each leg of the pair of legs are fixed such that contact and separation of the other ends of the pair of legs in the longitudinal direction of the load input portion are regulated and the ends of the pair of legs are displaced relative to the other ends of the pair of legs, as the load input portion folds; and a reversion restraining unit which restrains the impact absorption portion from reverting after absorption of collision energy, wherein the vehicle safety device is configured to generate a displacement area which suppresses an increase in a supported load with respect to an increase in folding displacement in a collision direction of the load input portion.

12. The vehicle safety device according to claim 11, wherein the impact absorption portion comprises an elastic member which deforms elastically while absorbing collision energy of the collision object; and the reversion restraining unit is configured so as to restrain the elastic member from reverting after absorption of the collision energy.

13. The vehicle safety device according to claim 12, wherein the elastic member comprises a load input portion that is elongated in the vehicle width direction, and a pair of support portions which support both ends in the longitudinal direction of the load input portion, such that the respective ends can be angularly displaced in direction orthogonal to the longitudinal direction of the load input portion with respect to the vehicle body; and the reversion restraining unit comprises a mechanism which allows both ends in the longitudinal direction of the load input portion to be angularly displaced around the support portion together with a deflection deformation of the load input portion toward the vehicle body side, and which prevents both ends in the longitudinal direction of the load input portion from being angularly displaced around the support portion in the reversion direction of the load input portion after absorption of the collision energy in the collision with the collision object.

14. The vehicle safety device according to any one of claims 11 to 13, wherein the impact absorption portion is supported contactably and separably with respect to the vehicle body; and an impact absorption portion driving unit is further provided which drives the impact absorption portion to an impact absorption position separated from the vehicle body if a collision with the collision object is predicted.

15. The vehicle safety device according to claim 14, wherein the impact absorption portion driving unit drives the impact absorption portion toward the vehicle body side after the collision object collides with the impact absorption portion.

* * * * *

UNITED STATES PATENT AND TRADEMARK OFFICE
CERTIFICATE OF CORRECTION

| | | |
|---|---|---|
| PATENT NO. | : 8,191,666 B2 | |
| APPLICATION NO. | : 12/530327 | |
| DATED | : June 5, 2012 | |
| INVENTOR(S) | : Atsushi Suzuki et al. | |

It is certified that error appears in the above-identified patent and that said Letters Patent is hereby corrected as shown below:

Column 27, line 46, change "are" to --is--;

Column 27, line 54, change "the" to --a--;

Column 29, line 4, before "other" insert --the--;

Column 29, line 7, change "are" to --is--; and

Column 29, line 8, before "ends" insert --other--.

Signed and Sealed this
Twenty-eighth Day of August, 2012

David J. Kappos
*Director of the United States Patent and Trademark Office*